US012137274B2

(12) United States Patent
Watanabe et al.

(10) Patent No.: US 12,137,274 B2
(45) Date of Patent: *Nov. 5, 2024

(54) VIDEO DISTRIBUTION SYSTEM DISTRIBUTING VIDEO THAT INCLUDES MESSAGE FROM VIEWING USER

(71) Applicant: Gree, Inc., Tokyo (JP)

(72) Inventors: Masashi Watanabe, Tokyo (JP); Yasunori Kurita, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/474,982

(22) Filed: Sep. 14, 2021

(65) Prior Publication Data
US 2021/0409827 A1    Dec. 30, 2021

Related U.S. Application Data

(63) Continuation of application No. 16/406,494, filed on May 8, 2019, now Pat. No. 11,190,848.

(30) Foreign Application Priority Data

May 8, 2018  (JP) .................................. 2018-089628
Aug. 14, 2018  (JP) .................................. 2018-152708
(Continued)

(51) Int. Cl.
*H04N 21/4784*  (2011.01)
*G06T 7/73*  (2017.01)
(Continued)

(52) U.S. Cl.
CPC .......... *H04N 21/4784* (2013.01); *G06T 7/73* (2017.01); *G06T 13/40* (2013.01); *G06V 40/23* (2022.01);
(Continued)

(58) Field of Classification Search
CPC .......... H04N 21/4784; H04N 21/4788; H04N 21/4882; H04N 21/47205;
(Continued)

(56) References Cited

U.S. PATENT DOCUMENTS 5,828,839 A * 10/1998 Moncreiff .............. H04N 7/173
709/204
5,923,337 A * 7/1999 Yamamoto ............ G06T 13/205
345/473
(Continued)

FOREIGN PATENT DOCUMENTS

CN      1792051 A  *  6/2006  ............. H04H 20/38
CN    101916274 A  *  12/2010
(Continued)

OTHER PUBLICATIONS

Notice of Reasons for Refusal dated May 17, 2022, issued in corresponding Japanese Patent Application No. 2021-115576 with English translation (18 pgs.).
(Continued)

*Primary Examiner* — John W Miller
*Assistant Examiner* — Akshay Doshi
(74) *Attorney, Agent, or Firm* — Pillsbury Winthrop Shaw Pittman LLP

(57) ABSTRACT

A video distribution system in one embodiment includes a storage that stores a first post message posted by a first user belonging to a first user group and a second post message posted by a second user belonging to a second user group, and one or more computer processors. In the embodiment, the one or more processors execute computer readable instructions to distribute a video that includes a first display area in which the first post message is displayed and a second display area in which the second post message is displayed but the first post message is undisplayed.

13 Claims, 15 Drawing Sheets

(30) Foreign Application Priority Data

| Nov. 1, 2018 | (JP) | ................................. 2018-206760 |
| Mar. 13, 2019 | (JP) | ................................. 2019-045554 |

(51) Int. Cl.
    *G06T 13/40*     (2011.01)
    *G06V 40/20*     (2022.01)
    *H04N 21/4788*     (2011.01)
    *H04N 21/488*     (2011.01)

(52) U.S. Cl.
    CPC .......... *G06V 40/28* (2022.01); *H04N 21/4788* (2013.01); *H04N 21/4882* (2013.01)

(58) Field of Classification Search
    CPC .......... H04N 21/44213; H04N 21/4312; G06T 7/73; G06T 13/40; G06V 40/23; G06V 40/28; G06V 40/16; G06V 40/20
    See application file for complete search history.

(56) References Cited

U.S. PATENT DOCUMENTS

| 10,498,794 | B1* | 12/2019 | Keighran | H04L 65/612 |
| 2005/0027986 | A1* | 2/2005 | Thomas | H04H 60/45 |
| | | | | 348/E7.071 |
| 2009/0167839 | A1* | 7/2009 | Ottmar | H04N 21/4314 |
| | | | | 348/14.08 |
| 2009/0287790 | A1* | 11/2009 | Upton | H04N 21/812 |
| | | | | 709/208 |
| 2009/0319601 | A1* | 12/2009 | Zvonaric | G06Q 30/02 |
| | | | | 709/203 |
| 2010/0100904 | A1* | 4/2010 | Kawakami | H04N 21/2665 |
| | | | | 725/109 |
| 2011/0288912 | A1* | 11/2011 | McCrea | G06Q 30/0217 |
| | | | | 705/14.2 |
| 2013/0145269 | A1* | 6/2013 | Latulipe | G06F 3/048 |
| | | | | 715/720 |
| 2014/0013200 | A1* | 1/2014 | White | G06F 16/78 |
| | | | | 715/230 |
| 2014/0089801 | A1* | 3/2014 | Agrawal | H04N 21/6582 |
| | | | | 715/719 |
| 2015/0302103 | A1* | 10/2015 | Jeremias | G06F 3/0482 |
| | | | | 715/758 |
| 2015/0334142 | A1* | 11/2015 | Gottlieb | H04N 21/47205 |
| | | | | 715/753 |
| 2016/0261902 | A1* | 9/2016 | Yerli | H04N 21/4126 |
| 2016/0267699 | A1* | 9/2016 | Borke | G06F 3/017 |
| 2016/0277328 | A1* | 9/2016 | Ishizuka | H04L 51/226 |
| 2016/0277802 | A1* | 9/2016 | Bernstein | H04N 21/44213 |
| 2017/0223422 | A1* | 8/2017 | Maruyama | H04N 13/183 |
| 2017/0368454 | A1* | 12/2017 | Sivak | A63F 13/35 |
| 2019/0102929 | A1* | 4/2019 | Davis | G06T 15/00 |
| 2019/0149852 | A1* | 5/2019 | Zhong | H04N 21/23439 |
| | | | | 725/109 |
| 2020/0014982 | A1* | 1/2020 | Iwaki | H04N 21/41407 |

FOREIGN PATENT DOCUMENTS

| CN | 106210857 | A | * | 12/2016 | ....... H04N 21/25866 |
| CN | 106231435 | A | * | 12/2016 | ......... H04N 21/4312 |
| CN | 106454482 | A | * | 2/2017 | ........... H04N 21/431 |
| CN | 106550278 | A | * | 3/2017 | ......... H04N 21/4508 |
| CN | 107438183 | A | | 12/2017 | |
| EP | 2779636 | A2 | * | 9/2014 | ............. G06Q 10/10 |
| JP | H05111571 | A | * | 5/1993 | |
| JP | 2012-120098 | A | | 6/2012 | |
| JP | 2015-184689 | A | | 10/2015 | |
| WO | WO-9424826 | A1 | * | 10/1994 | ............. G06Q 30/04 |
| WO | WO-2012057509 | A2 | * | 5/2012 | ............... G06F 3/14 |
| WO | 2017/159383 | A1 | | 9/2017 | |
| WO | WO-2017206909 | A1 | * | 12/2017 | ........... H04N 21/442 |

OTHER PUBLICATIONS

Ito, Complete Storage of Ninico Animation, vol. 23, No. 831, Japan, ASCII Media Works, Jan. 25, 2011, vol. 23, pp. 2-6, (8 pgs.).
Nico Nico Douga Developer's Notes , Nikkei Software vol. 11, No. 6, Nikkei Software , Japan, Nikkei BP, Ltd., Jan. 24, 2004, vol. 11, p. 42-47 Nikkei Business Publications,Inc., 2008, (8 pgs.).
Koda Yuji 2 New function of new function! Nichihiro Animation, vol. 20, No. 697, Japan, ASCII Media Works, 2008, Jan. 5, 2008, vol. 20, p. 131, (3 pgs.).
Moving Pictures, Live Distribution Applications "MixChannel ," a good item such as a popular character of "Poco Pan" or "Bechu," and a good item such as a Web page [MixChannel LIVE] PR Times, 2017 URL:https://prtimes.jp/main/html/rd/p/000000095.000004237. html (4 pgs.).
Broadcasting with fans [Jan. 1, 2006]! "AniCast," Addition of a ******** function to ",", Japan, *** Co., Ltd., Jan. 5, 2018, Internet http://www.xvi.co.jp/wp-content/uploads/2018/04/AniCast-PressRelease.pdf (4 pgs.).
MoguLive, MoguLive, Virtual seminars Shinonome Megu live broadcasting Apr. 6, 2018, (5 pgs.).
Second Office Action dated Oct. 9, 2021, issued in the corresponding Chinese Application No. 201910374844.5 with English translation (21 pgs.).
Notice of Reasons for Refusal dated Nov. 29, 2022, issued in corresponding Japanese Patent Application No. 2021-115576 with English translation (4 pgs.).
First Office Action dated Jan. 20, 2024, issued in corresponding Chinese Patent Application No. 202210559306.5 with English translation (33 pgs.).

\* cited by examiner

| Account information | Possessed object |
|---|---|
| User ID | Object ID |

Fig. 3

| Account information | Decorative object for which display request made |
|---|---|
| User ID | Object ID |

Fig. 4

| Account information | Group information | Post message |
|---|---|---|
| User ID | Group ID | Posted text information, posted image, etc. |

Fig. 5

| Account information | Video information | Video viewing information |
|---|---|---|
| User ID | Video ID | Viewing time, the number of views, etc. |

Fig. 6

VIDEO DISTRIBUTION SYSTEM DISTRIBUTING VIDEO THAT INCLUDES MESSAGE FROM VIEWING USER

CROSS-REFERENCE TO RELATED APPLICATIONS

This application is a Continuation Application of U.S. Ser. No. 16/406,494, filed on May 8, 2019, and claims the benefit of priority under 35 U.S.C. 119 from Japanese Patent Application Serial No. 2018-89628 (filed on May 8, 2018), Japanese Patent Application Serial No. 2018-152708 (filed on Aug. 14, 2018), Japanese Patent Application Serial No. 2018-206760 (filed on Nov. 1, 2018) and Japanese Patent Application Serial No. 2019-45554 (filed on Mar. 13, 2019), the contents of which are hereby incorporated by reference in its entirety.

TECHNICAL FIELD

The present disclosure relates to a video distribution system distributing a video that includes messages from viewing users. The present disclosure relates to, in particular, a video distribution system distributing a video that includes animation of a character object generated based on actor's motions and messages from viewing users.

BACKGROUND

Video distribution systems that produce an animation of a character object based on actor's motions and distribute a video including the animation of the character object have been known. Such a video distribution system is disclosed, for example, in Japanese Patent Application Publication No. 2015-184689 ("the '689 Publication").

The '689 Publication discloses that a chat function can be implemented in the video distribution system. The chat function allows a viewing user who views a video to post a message. An actor is able to view the posted message. When the actor reacts to the message, the reaction is reflected in the video. With this chat function, interaction between viewing users and interaction between a viewing user(s) and an actor(s) are realized.

Conventionally, a part of a display screen displaying a video is used as an area in which a post message is displayed. Due to space constraints on the display screen, the display area of the post message may overlap with a character object in some situations. In this case, viewing experience of the viewing user may be degraded due to the overlapped display between the post message and the character object. For example, if a main part of the character object is hidden behind the post message, the viewer may feel his/her viewing of the video is impeded.

When the display area of the post message is allocated in a certain area of the display screen and display control is performed such that the character object is not displayed in this display area, it is possible to avoid the overlapping display between the character object and the post message. However, in this case, the display position of the character object is limited, which may be a major constraint on video production.

When the display area of the post message is limited to a certain area of the screen as described above, it becomes difficult to provide the user with a gratifying viewing experience. As described above, it is desired that some improvement should be made to how to display post messages in a video including animation of a character object.

It is an object of the present disclosure to provide a technical improvement which solves or alleviates at least part of the drawbacks of the prior art mentioned above.

SUMMARY

A video distribution system according to one aspect of the invention includes a storage that stores a first post message posted by a first user belonging to a first user group and a second post message posted by a second user belonging to a second user group, and one or more computer processors. The one or more processors execute computer readable instructions to distribute a video that includes a first display area in which the first post message is displayed and a second display area in which the second post message is displayed but the first post message is undisplayed.

In the video distribution system, the second user group may include a smaller number of users than the first user group.

In the video distribution system, the first post message may be moved in a first direction in the first display area.

In the video distribution system, the second post message may be moved in a second direction in the second display area.

In the video distribution system, the second direction may be changed in accordance with a first command included in the second post message.

In the video distribution system, a position where the second post message is initially displayed in the second display area may be changed in accordance with a second command included in the second post message.

In the video distribution system, a moving speed of the second post message in the second display area may be slower than a moving speed of the first post message in the first display area.

In the video distribution system, a time period in which the second post message is displayed in the second display area may be longer than a time period in which the first post message is displayed in the first display area.

In the video distribution system, information other than the first post message may also be displayed in the first display area.

In the video distribution system, the storage may store an electronic gift from the first user and/or the second user.

In the video distribution system, the information other than the first post message may include a notification indicating that provision of the electronic gift has been performed.

In the video distribution system, the second user may be a user who provides the electronic gift whose parameter satisfies a predetermined condition.

In the video distribution system, the second user may be a user who viewed the video more than a predetermined number of times.

In the video distribution system, the first user may be withdrawn from the first user group and belong to the second user group when the first user has posted the first post message a predetermined number of times or more.

In the video distribution system, the video includes an animation of a character object generated based on actor's motions.

In the video distribution system, at least a part of the second display area may be disposed behind the character object.

In the video distribution system, when the first display area overlaps with the character object, the character object may be disposed behind the first display area.

The video distribution system may further include two or more cameras, and the video may include an image of a virtual space created based on tracking information of an active sensor selected from among the two or more cameras.

In the video distribution system, a size of the second display area in the virtual space may be changed depending on the position and the orientation of the active sensor.

In the video distribution system, the second display area is provided in the virtual space and the size of the second display area in the virtual space may be changed depending on the position and the orientation of the active sensor.

According to another aspect of the invention, provided is a method of distributing a video performed by executing computer readable instructions by one or more computer processor. The method includes a step of storing a first post message posted by a first user belonging to a first user group, a step of storing a second post message posted by a second user belonging to a second user group, and a step of distributing a video that includes a first display area in which the first post message is displayed and a second display area in which the second post message is displayed but the first post message is undisplayed.

According to yet another aspect of the invention, provided is a computer-readable tangible non-transitory storage medium comprising a program executed by one or more computer processors. The computer program causes the one or more computer processors to perform a step of storing a first post message posted by a first user belonging to a first user group, a step of storing a second post message posted by a second user belonging to a second user group, and a step of distributing a video that includes a first display area in which the first post message is displayed and a second display area in which the second post message is displayed but the first post message is undisplayed.

According to the above aspects, it is possible to display a message posted by a viewing user who views a video in a display area corresponding to a user group to which the viewing user belongs.

BRIEF DESCRIPTION OF THE DRAWINGS

FIG. 3 illustrates a possession list stored in the video distribution system of FIG. 1.

FIG. 4 illustrates a candidate list stored in the video distribution system of FIG. 1.

FIG. 5 illustrates posted data stored in the video distribution system of FIG. 1.

FIG. 6 illustrates viewing management data stored in the video distribution system of FIG. 1.

DESCRIPTION OF THE PREFERRED EMBODIMENTS

Figure 1:
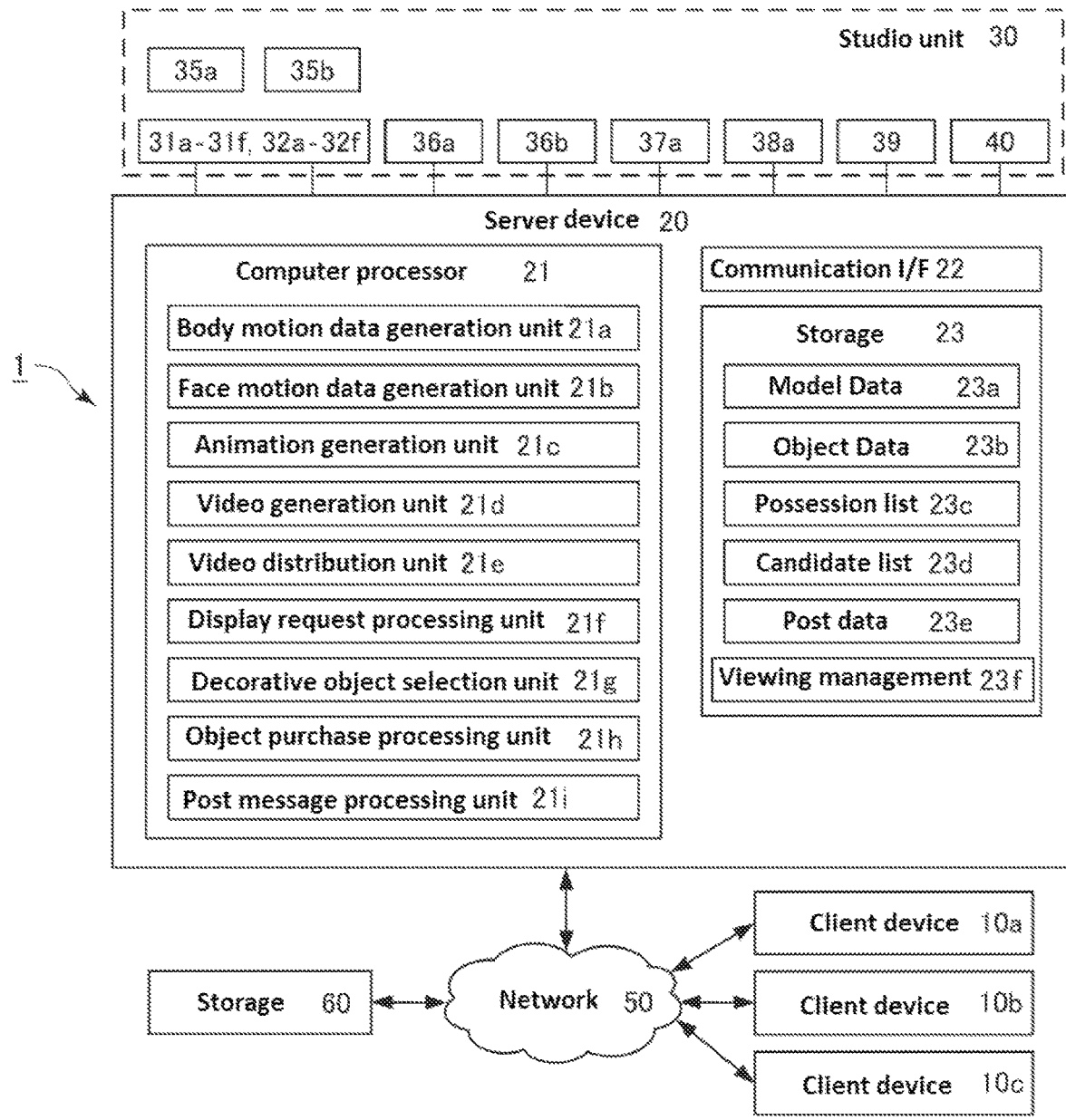
FIG. 1 is a block diagram illustrating a video distribution system according to one embodiment.

Various embodiments of the disclosure will be described hereinafter with reference to the accompanying drawings. Throughout the drawings, the same or similar elements are denoted by the same reference numerals.

Figure 2:
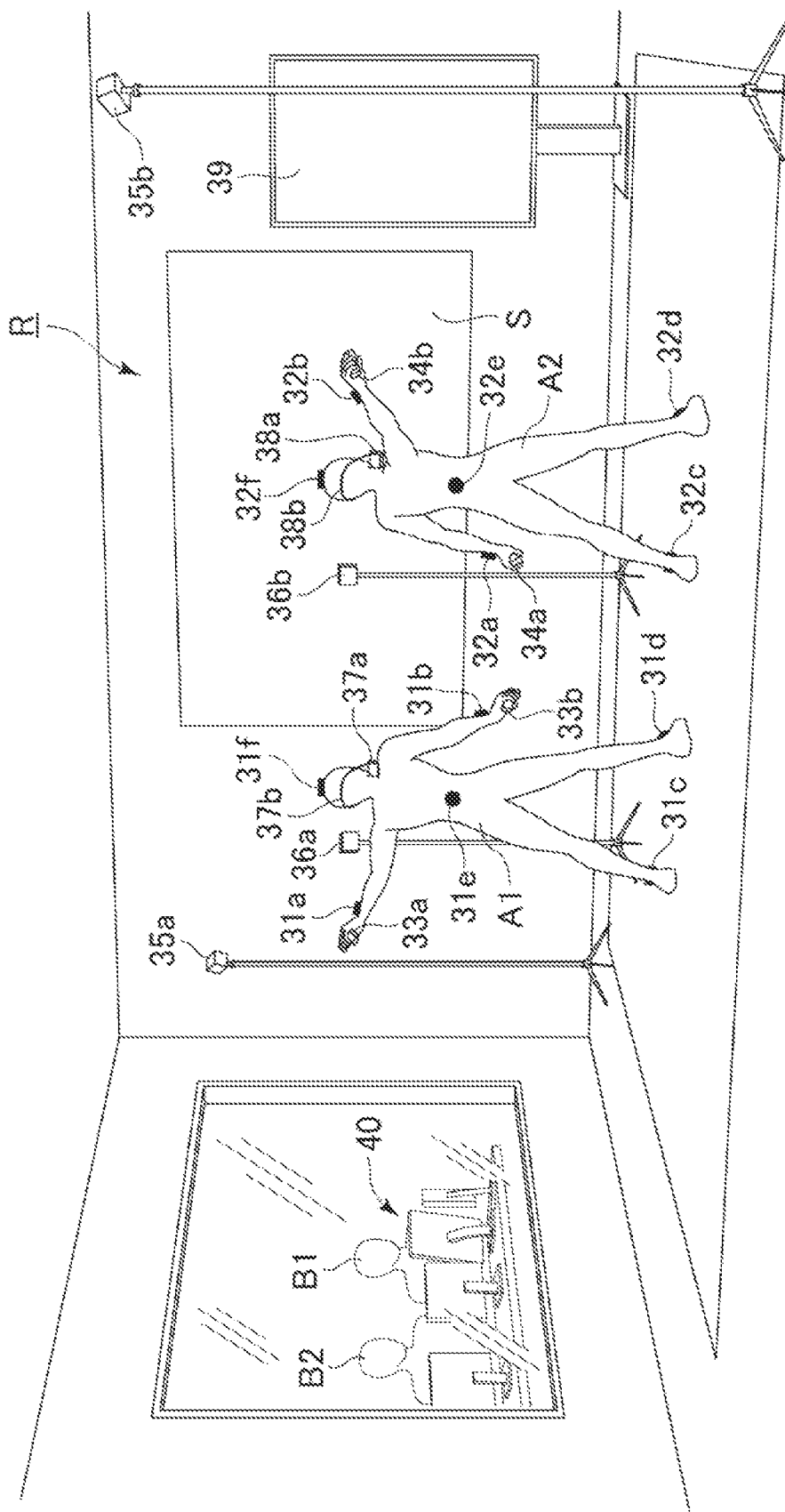
FIG. 2 schematically illustrates a installation of a studio where production of a video that is distributed in the video distribution system of FIG. 1 is performed.

With reference to FIGS. 1 to 6, a video distribution system according to an embodiment will be described. FIG. 1 is a block diagram illustrating a video distribution system 1 according to one embodiment, FIG. 2 schematically illustrates an installation of a studio where production of a video to be distributed in the video distribution system 1 is performed, and FIGS. 3 to 6 are for describing information stored in the video distribution system 1.

The video distribution system 1 includes client devices 10a to 10c, a server device 20, a studio unit 30, and a storage 60. The client devices 10a to 10c, the server device 20, and the storage 60 are communicably interconnected over a network 50. The server device 20 is configured to distribute a video including an animation of a character, as described later. The character included in the video may be motion controlled in a virtual space.

The video may be distributed from the server device 20 to each of the client devices 10a to 10c. A first viewing user who is a user of the client device 10a, a second viewing user who is a user of the client device 10b, and a third viewing user who is a user of the client device 10c are able to view the distributed video with their client device. The video distribution system 1 may include less than three client devices, or may include more than three client devices.

The client devices 10a to 10c are information processing devices such as smartphones. In addition to the smartphone, the client devices 10a to 10c each may be a mobile phone, a tablet, a personal computer, an electronic book reader, a wearable computer, a game console, or any other information processing devices that are capable of playing videos. Each of the client devices 10a to 10c may include a computer processor, a memory unit, a communication I/F, a display, a sensor unit including various sensors such as a gyro sensor, a sound collecting device such as a microphone, and a storage for storing various information.

The display 10 of each client devices 10a to 10c includes a display panel and a touch-screen panel. The touch-screen panel is configured to detect touch interactions (touch operations) performed by a user. The touch-screen panel is capable of detecting various touch operations such as tapping, double tapping, and dragging performed by the user. The touch-screen panel may include a capacitive proximity sensor and may be capable of detecting a non-contact operation performed by the user.

Viewing users can input a message regarding the distributed video or other messages via the respective touch-screen panels of the client devices 10a to 10c. The message may be, for example, a text message, a still image message, a moving image message, and any other electronic message. Each of the client devices 10a to 10c may be configured to post (send) the message input by the viewing user to the server device 20. In this specification, a message transmitted to the server device 20 from the client devices 10a to 10c and/or other client devices that are used for viewing the distributed video may be referred to as a post message. For example, regarding the video distributed to the client device 10a of the first viewing user, a message that the first viewing user inputs to the client device 10a and is then transmitted from the client device 10a to the server device 20 is referred to as a post message of the first viewing user.

In the illustrated embodiment, the server device 20 includes a computer processor 21, a communication I/F 22, and a storage 23.

The computer processor 21 is a computing device which loads various programs realizing an operating system and various functions from the storage 23 or other storage into a memory unit and executes instructions included in the loaded programs. The computer processor 21 is, for example, a CPU, an MPU, a DSP, a GPU, any other computing device, or a combination thereof. The computer processor 21 may be realized by means of an integrated circuit such as ASIC, PLD, FPGA, MCU, or the like. Although the computer processor 21 is illustrated as a single component in FIG. 1, the computer processor 21 may be a collection of a plurality of physically separate computer processors. In this specification, a program or instructions included in the program that are described as being executed by the computer processor 21 may be executed by a single computer processor or distributed and executed by a plurality of computer processors. Further, a program or instructions included in the program executed by the computer processor 21 may be executed by a plurality of virtual computer processors.

The communication I/F 22 may be implemented as hardware, firmware, or communication software such as a TCP/IP driver or a PPP driver, or a combination thereof. The server device 20 is able to transmit and receive data to and from other devices via the communication I/F 22.

The storage 23 is an storage device accessed by the computer processor 21. The storage 23 is, for example, a magnetic disk, an optical disk, a semiconductor memory, or various other storage device capable of storing data. Various programs may be stored in the storage 23. At least some of the programs and various data that may be stored in the storage 23 may be stored in a storage (for example, a storage 60) that is physically separated from the server device 20.

Most of components of the studio unit 30 are disposed, for example, in a studio room R shown in FIG. 2. As illustrated in FIG. 2, an actor A1 and an actor A2 give performances in the studio room R. The studio unit 30 is configured to detect motions and expressions of the actor A1 and the actor A2, and to output the detection result information to the server device 20.

Both the actor A1 and the actor A2 are objects whose motions and expressions are captured by a sensor group provided in the studio unit 30, which will be described later. In the illustrated embodiment, the actor A1 and the actor A2 are humans who talk, give a performance, and perform other actions for advancing a program distributed as the video. The actor A1 and the actor A2 may be animals or any other moving (non-living) objects other than humans. The actor A1 and the actor A2 may be, for example, autonomous robots. The number of actors in the studio room R may be one or three or more.

The studio unit 30 includes six motion sensors 31a to 31f attached to the actor A1, a controller 33a held by the left hand of the actor A1, a controller 33b held by the right hand of the actor A1, and a camera 37a attached to the head of the actor A1 via an attachment 37b. The studio unit 30 also includes six motion sensors 32a to 32f attached to the actor A2, a controller 34a held by the left hand of the actor A2, a controller 34b held by the right hand of the actor A2, and a camera 38a attached to the head of the actor A2 via an attachment 38b. A microphone for collecting audio data may be provided to each of the attachment 37b and the attachment 38b. The microphone can collect speeches of the actor A1 and the actor A2 as voice data. The microphones may be wearable microphones attached to the actor A1 and the actor A2 via the attachment 37b and the attachment 38b. Alternatively the microphones may be installed on the floor, wall or ceiling of the studio room R. In addition to the components described above, the studio unit 30 includes a base station 35a, a base station 35b, a tracking sensor 36a, a tracking sensor 36b, and a display 39. A supporter computer 40 is installed in a room next to the studio room R, and these two rooms are separated from each other by a glass window. The server device 20 may be installed in the same room as the room in which the supporter computer 40 is installed.

The motion sensors 31a to 31f and the motion sensors 32a to 32f cooperate with the base station 35a and the base station 35b to detect their position and orientation. In one embodiment, the base station 35a and the base station 35b are multi-axis laser emitters. The base station 35a emits flashing light for synchronization and then emits a laser beam about, for example, a vertical axis for scanning. The base station 35a emits a laser beam about, for example, a horizontal axis for scanning. Each of the motion sensors 31a to 31f and the motion sensors 32a to 32f may be provided with a plurality of optical sensors for detecting incidence of the flashing lights and the laser beams from the base station 35a and the base station 35b, respectively. The motion sensors 31a to 31f and the motion sensors 32a to 32f each may detect its position and orientation based on a time difference between an incident timing of the flashing light and an incident timing of the laser beam, time when each optical sensor receives the light and or beam, an incident angle of the laser light detected by each optical sensor, and any other information as necessary. The motion sensors 31a to 31f and the motion sensors 32a to 32f may be, for example, Vive Trackers provided by HTC CORPORATION. The base station 35a and the base station 35b may be, for example, base stations provided by HTC CORPORATION.

Detection result information about the position and the orientation of each of the motion sensors 31a to 31f and the motion sensors 32a to 32f that are estimated in the corresponding motion sensor is transmitted to the server device 20. The detection result information may be wirelessly transmitted to the server device 20 from each of the motion sensors 31a to 31f and the motion sensors 32a to 32f. Since the base station 35a and the base station 35b emit flashing light and a laser light for scanning at regular intervals, the detection result information of each motion sensor is updated at each interval. Three or more base stations may be provided. The position of the tracking sensor may be changed as appropriate. For example, in addition to or instead of the upper corner of the space to be detected by the tracking sensor, a pair of the tracking sensors may be disposed at a upper position and a lower position close to the floor. For example, there may be four base stations.

In the illustrated embodiment, the six motion sensors 31a to 31f are mounted on the actor A. The motion sensors 31a, 31b, 31c, 31d, 31e, and 31f are attached to the left wrist, the right wrist, the left instep, the right instep, the hip, and top of the head of the actor A1, respectively. The motion sensors 31a to 31f may each be attached to the actor A1 via an attachment. The six motion sensors 32a to 32f are mounted on the actor A2. The motion sensors 32a to 32f may be attached to the actor A2 at the same positions as the motion sensors 31a to 31f. The motion sensors 31a to 31f and the motion sensors 32a to 32f shown in FIG. 2 are merely an example. The motion sensors 31a to 31f may be attached to various parts of the body of the actor A1, and the motion sensors 32a to 32f may be attached to various parts of the body of the actor A2. The number of motion sensors attached to the actor A1 and the actor A2 may be less than or more than six. As described above, body movements of the actor A1 and the actor A2 are detected by detecting the position and the orientation of the motion sensors 31a to 31f and the motion sensors 32a to 32f attached to the body parts of the actor A1 and the actor A2.

In one embodiment, a plurality of infrared LEDs are mounted on each of the motion sensors attached to the actor A1 and the actor A2, and light from the infrared LEDs are sensed by infrared cameras provided on the floor and/or wall of the studio room R to detect the position and the orientation of each of the motion sensors. Visible light LEDs may be used instead of the infrared LEDs, and in this case light from the visible light LEDs may be sensed by visible light cameras to detect the position and the orientation of each of the motion sensors. As described above, a light emitting unit (for example, the infrared LED or visible light LED) may be provided in each of the plurality of motion sensors attached to the actor, and a light receiving unit (for example, the infrared camera or visible light camera) provided in the studio room R senses the light from the light emitting unit to detect the position and the orientation of each of the motion sensors.

In one embodiment, a plurality of reflective markers may be used instead of the motion sensors 31a-31f and the motion sensors 32a-32f. The reflective markers may be attached to the actor A1 and the actor A2 using an adhesive tape or the like. The position and orientation of each reflective marker can be estimated by capturing images of the actor A1 and the actor A2 to which the reflective markers are attached to generate captured image data and performing image processing on the captured image data.

The controller 33a and the controller 33b supply, to the server device 20, control signals that correspond to operation of the actor A1. Similarly, the controller 34a and the controller 34b supply, to the server device 20, control signals that correspond to operation of the actor A2.

The tracking sensor 36a and the tracking sensor 36b generate tracking information for determining configuration information of a virtual camera used for constructing a virtual space included in the video. The tracking information of the tracking sensor 36a and the tracking sensor 36b is calculated as the position in its three-dimensional orthogonal coordinate system and the angle around each axis. The position and orientation of the tracking sensor 36a may be changed according to operation of the operator. The tracking sensor 36a transmits the tracking information indicating the position and the orientation of the tracking sensor 36a to the tracking information server device 20. Similarly, the position and the orientation of the tracking sensor 36b may be set according to operation of the operator. The tracking sensor 36b transmits the tracking information indicating the position and the orientation of the tracking sensor 36b to the tracking information server device 20. In the illustrated embodiment, the tracking sensor 36a is disposed on the left front of the actor A1. The tracking sensor 36b is disposed in front of the actor A1 and the actor A2 and approximately halfway between the actor A1 and the actor A2.

The camera 37a is attached to the head of the actor A1 as described above. For example, the camera 37a is disposed so as to capture an image of the face of the actor A1. The camera 37a continuously captures images of the face of the actor A1 to obtain imaging data of the face of the actor A1. Similarly, the camera 38a is attached to the head of the actor A2. The camera 38a is disposed so as to capture an image of the face of the actor A2 and continuously capture images of the face of the actor A2 to obtain captured image data of the face of the actor A2. The camera 37a transmits the captured image data of the face of the actor A1 to the server device 20, and the camera 38a transmits the captured image data of the face of the actor A2 to the server device 20. The camera 37a and the camera 38a may be 3D cameras capable of detecting the depth of a face of a person.

The display 39 is configured to display information received from the support computer 40. The information transmitted from the support computer 40 to the display 39 may include, for example, text information, image information, and various other information. The display 39 is disposed at a position where the actor A1 and the actor A2 are able to see the display 39.

In the illustrated embodiment, the supporter computer 40 is installed in the next room of the studio room R. Since the room in which the supporter computer 40 is installed and the studio room R are separated by the glass window, an operator of the supporter computer 40 (sometimes referred to as "supporter" in the specification) is able to see the actor A1 and the actor A2. In the illustrated embodiment, supporters B1 and B2 are present in the room as the operators of the supporter computer 40.

The supporter computer 40 may be configured to be capable of changing the setting(s) of the component(s) of the studio unit 30 according to the operation by the supporter B1 and the supporter B2. The supporter computer 40 can change, for example, the setting of the scanning interval performed by the base station 35a and the base station 35b, the position or orientation of the tracking sensor 36a and the tracking sensor 36b, and various settings of other devices. Switching of active sensor(s) which will be described later may be performed based on the operation of the supporter computer 40 by the supporter B1 and the supporter B2. At least one of the supporter B1 and the supporter B2 is able to input a message to the supporter computer 40, and the input message is displayed on the display 39.

The components and functions of the studio unit 30 shown in FIG. 2 are merely example. The studio unit 30 applicable to the invention may include various constituent elements that are not shown. For example, the studio unit 30 may include a projector. The projector is able to project a video distributed to the client device 10a or another client device on the screen S.

Next, information stored in the storage 23 in one embodiment will be described. In the illustrated embodiment, the storage 23 stores model data 23a, object data 23b, a possession list 23c, a candidate list 23d, post data 23e, viewing management data 23f, and any other information required for generation and distribution of a video to be distributed.

The model data 23a is model data for generating animation of a character. The model data 23a may be three-dimensional model data for generating three-dimensional animation, or may be two-dimensional model data for generating two-dimensional animation. The model data 23a includes, for example, rig data (also referred to as "skeleton data") indicating a skeleton of a character, and surface data indicating the shape or texture of a surface of the character. The model data 23a may include data of two or more different models. Pieces of model data may each have different rig data, or may have the same rig data. The pieces of model data may have surface data different from each other or may have the same surface data. In the illustrated embodiment, in order to generate a character object corresponding to the actor A1 and a character object corresponding to the actor A2, the model data 23a includes at least two types of model data different from each other. The model data for the character object corresponding to the actor A1 and the model data for the character object corresponding to the actor A2 may have, for example, the same rig data but different surface data from each other.

The object data 23b includes asset data used for constructing a virtual space in the video. The object data 23b includes data for rendering a background of the virtual space in the video, data for rendering various objects displayed in the video, and data for rendering any other objects displayed in the video. The object data 23a may include object position information indicating the position of an object in the virtual space.

In addition to the above, the object data 23b may include a gift object displayed in the video in response to a display request from viewing users of the client devices 10a to 10c. The gift object may include an effect object, a normal object, and a decorative object. Viewing users are able to purchase a desired gift object.

The effect object is an object that affects the impression of the entire viewing screen of the distributed video, and is, for example, an object representing confetti. The object representing confetti may be displayed on the entire viewing screen, which can change the impression of the entire viewing screen before and after its display. The effect object may be displayed so as to overlap with the character object, but it is different from the decorative object in that it is not displayed in association with a specific portion of the character object.

The normal object is an object functioning as a digital gift from a viewing user (for example, the actor A1 or the actor A2) to an actor, for example, an object resembling a stuffed toy or a bouquet. In one embodiment, the normal object is displayed on the display screen of the video such that it does not contact the character object. In one embodiment, the normal object is displayed on the display screen of the video such that it does not overlap with the character object. The normal object may be displayed in the virtual space such that it overlaps with an object other than the character object. The normal object may be displayed so as to overlap with the character object, but it is different from the decorative object in that it is not displayed in association with a specific portion of the character object. In one embodiment, when the normal object is displayed such that it overlaps with the character object, the normal object may hide portions of the character object other than the head including the face of the character object but does not hide the head of the character object.

The decorative object is an object displayed on the display screen in association with a specific part of the character object. In one embodiment, the decorative object displayed on the display screen in association with a specific part of the character object is displayed adjacent to the specific part of the character object on the display screen. In one embodiment, the decorative object displayed on the display screen in association with a specific part of the character object is displayed such that it partially or entirely covers the specific part of the character object on the display screen.

The decorative object is an object that can be attached to a character object or the character object can wear, for example, an accessory (such as a headband, a necklace, an earring, etc.), clothes (such as a T-shirt), a costume, and any other object which the character object can wear. The object data 23b corresponding to the decorative object may include attachment position information indicating which part of the character object the decorative object is associated with. The attachment position information of a decorative object may indicate to which part of the character object the decorative object is attached. For example, when the decorative object is a headband, the attachment position information of the decorative object may indicate that the decorative object is attached to the "head" of the character object. When the decorative object is a T-shirt, the attachment position information of the decorative object may indicate that the decorative object is attached to the "torso" of the character object.

A duration of time of displaying the gift objects may be set for each gift object depending on its type. In one embodiment, the duration of displaying the decorative object may be set longer than the duration of displaying the effect object and the duration of displaying the normal object. For example, the duration of displaying the decorative object may be set to 60 seconds, while the duration of displaying the effect object may be set to 5 seconds and the duration of displaying the normal object may be set to 10 seconds.

The possession list 23c is a list showing gift objects possessed by viewing users of a video. An example of the possession list 23c is shown in FIG. 3. As illustrated, in the possession list 23c, an object ID for identifying a gift object possessed by a viewing user is stored in association with account information of the viewing user (for example, user ID of the viewing user). The viewing users include, for example, the first to third viewing users of the client devices 10a to 10c.

The candidate list 23d is a list of decorative objects for which a display request has been made from a viewing user. As will be described later, a viewing user who holds a decorative object(s) is able to make a request to display his/her possessed decorative objects. In the candidate list 23d, object IDs for identifying decorative objects are stored in association with the account information of the viewing user who has made a request to display the decorative objects. The candidate list 23d may be created for each distributor. The candidate list 23d may be stored, for example, in association with distributor identification information that identify a distributor(s) (the actor A1, the actor A2, the supporter B1, and/or the supporter B2).

The post data 23e is data indicating a post message posted by a viewing user. The post data 23e includes account information of a viewing user who has posted a post message, group information indicating a user group to which the viewing user belongs, and the post message posted by the viewing user. As described above, the storage 23 may store, in association with the account information of the viewing user, the group information about a user group to which the viewing user belongs, and a post message posted by the viewing user. The post data 23e may include the time when each post message was posted (for example, the time when the post message sent from a client device was received by the server device 20, or the time when the post message received by the server device 20 was written in a predetermined storage area in the storage 23).

The account information of a viewing user is, for example, user identification information (user ID) of the viewing user.

The group information is group identification information (group ID) for identifying a group to which the viewing user belongs. The group to which the viewing user belongs includes, for example, a first user group and a second user group. For example, the first user group is a general user group to which general users belong, and the second user group is a premium user group to which premium users different from the general users belong.

Various criteria may be employed to classify users into the first user group or the second user group. Among the viewing users, users whose number of viewing times of the video is less than a predetermined number may be classified as the general users, and users whose number of viewing times is equal to or more than the predetermined number may be classified as the premium users. Among the viewing users, users whose viewing time of the video is shorter than a predetermined time may be classified as the general users, and users whose viewing time is longer than the predetermined time may be classified as the premium users. Users whose amount of money spent for the gift objects is smaller than a predetermined amount may be classified as general users, and users whose amount of money spent for the gift objects is equal to or more than the predetermined amount may be classified as the premium users. Users whose purchase amount of the gift objects is smaller than a predetermined amount may be classified as general users, and users whose purchase amount of the gift objects is equal to or more than the predetermined amount may be classified as the premium users. Among the viewing users, users whose number of times they posted messages is less than a predetermined number may be classified as general users, and users whose number of times they posted messages is equal to or more than the predetermined number may be classified as the premium users. The number of viewing times, the viewing time, the amount of money spent for the gift objects, the purchase amount of gift object, the number of message posts may be cumulative values accumulated from the start of use of the video distribution system 1, or aggregate values calculated in a predetermined period.

In one embodiment, the second user group includes a smaller number of users than the first user group. The viewing users are classified into the first user group when the users register themselves to the video distribution system 1. When the viewing users satisfy the criteria for being classified into the second user group after they started the use of the video distribution system 1, the viewing users are withdrawn from the first user group and belong to the second user group. Thus, the user group to which the viewing user belongs may be changed according to the usage pattern of the video distribution system 1. When the viewing user no longer satisfies the criteria for being classified into the second user group, the user group to which the viewing user belongs may be changed to the first user group from the second user group.

In one embodiment, the criteria to classify the viewing users into the user groups may be dynamically adjusted such that the number of viewing users belonging to the first user group is less than the number of viewing users belonging to the second user group. For example, the server device 20 monitors the number of viewing users belonging to the first user group and the number of viewing users belonging to the second user group, and when the difference therebetween becomes smaller than a predetermined value, the criteria for classifying the viewing users into the second user group may be made stricter. For example, in a case where a viewing user who views the video for 10 hours or more using the video distribution system 1 is initially classified into the second user group, when the difference between the number of users belonging to the second user group and the number of the first user group becomes smaller than a predetermined value, the criterion may be changed to classify a viewing user who views the video for 20 hours or more using the video distribution system 1 into the second user group.

Classification of the viewing users is not limited to the examples specifically described in the specification. Alternatively the viewing users may be classified into three or more groups. In addition, any classification criteria for determining which group each viewing user belongs to may be adopted.

The post message is a message posted by a viewing user via a client device. A message posted by the viewing user may include, for example, a text message, a still image message, a moving image message, and any other types of messages. In this specification, a post message posted by the viewing user belonging to the first user group may be referred to as a first post message, and a post message posted by the viewing user belonging to the second user group may be referred to as a second post message.

The viewing management data 23f is data for managing viewing of the video by a viewing user. The viewing management data 23f includes viewing users account information, video information on a video distributed by the video distribution system 1, and video viewing information on viewing of the video. Thus, the storage 23 may store the video information about a video viewed by a viewing user and the video viewing information about the viewing user's viewing the video in association with the account information of the viewing user. The video information is, for example, video identification information (video ID) for identifying a video. The video viewing information may include viewing time, the number of times that the viewing user viewed the video, and any other data regarding viewing of the video by the viewing user.

Functions realized by the computer processor 21 will be now described more specifically. The computer processor 21 functions as a body motion data generation unit 21a, a face motion data generation unit 21b, an animation generation unit 21c, a video generation unit 21d, a video distribution unit 21e, a display request processing unit 21f, a decorative object selection unit 21g, an object purchase processing unit 21h, and a post message processing unit 21i by executing computer-readable instructions included in a distributed program. At least some of the functions that can be realized by the computer processor 21 may be realized by a computer processor other than the computer processor 21 of the video distribution system 1. For example, at least some of the functions realized by the computer processor 21 may be realized by a computer processor mounted on the supporter computer 40.

The body motion data generation unit 21a generates first body motion data of each part of the body of the actor A1 based on detection information of the corresponding motion sensors 31a to 31f, and generates second body motion data, which is a digital representation of the position and the orientation of each part of the body of the actor A2, based on detection information of the corresponding motion sensors 32a to 32f. In the specification, the first body motion data and the second body motion data may be collectively referred to simply as "body motion data." The body motion data is serially generated with time as needed. For example, the body motion data may be generated at predetermined sampling time intervals. Thus, the body motion data can represent body movements of the actor A1 and the actor A2 in time series as digital data. In the illustrated embodiment, the motion sensors 31a to 31f and the motion sensors 32a to 32f are attached to the left and right limbs, the waist, and the head of the actor A1 and the actor A2, respectively. Based on the detection information of the motion sensors 31a to 31f and the motion sensors 32a to 32f, it is possible to digitally represent the substantial position and orientation of the whole body of the actor A1 and the actor A2 in time series. The body motion data can define, for example, the position and rotation angle of bones corresponding to the rig data included in the model data 23a.

The face motion data generation unit 21b generates first face motion data, which is a digital representation of motions of the face of the actor A1, based on captured image data of the camera 37a, and generates second face motion data, which is a digital representation of motions of the face of the actor A2, based on captured image data of the camera 38a. In the specification, the first face motion data and the second face motion data may be collectively referred to simply as "face motion data." The face motion data is generated serially with time as needed. For example, the face motion data may be generated at predetermined sampling time intervals. Thus, the face motion data can digitally represent facial motions (changes in facial expression) of the actor A1 and the actor A2 in time series.

The animation generation unit 21c is configured to apply the body motion data generated by the body motion data generation unit 21a and the face motion data generated by the face motion data generation unit 21b to predetermined model data included in the model data 23a in order to generate an animation of a character object that moves in a virtual space and whose facial expression changes. More specifically, the animation generation unit 21c may generate an animation of a character object moving in synchronization with the motions of the body and facial expression of the actor A1 based on the first body motion data and the first face motion data related to the actor A1, and generate an animation of a character object moving in synchronization with the motions of the body and facial expression of the actor A2 based on the second body motion data and the second face motion data related to the actor A2. In the specification, a character object generated based on the movement and expression of the actor A1 may be referred to as a "first character object", and a character object generated based on the movement and expression of the actor A2 may be referred to as a "second character object."

The video generation unit 21d constructs a virtual space using the object data 23b, and generates a video that includes the virtual space, the animation of the first character object corresponding to the actor A1, and the animation of the second character object corresponding to the actor A2. The first character object is disposed in the virtual space so as to correspond to the position of the actor A1 with respect to the tracking sensor 36a, and the second character object is disposed in the virtual space so as to corresponds to the position of the actor A2 with respect to the tracking sensor 36a. Thus, it is possible to change the position and the orientation of the first character object and the second character object in the virtual space by changing the position or the orientation of the tracking sensor 36a.

In one embodiment, the video generation unit 21d constructs a virtual space based on tracking information of the tracking sensor 36a. For example, the video generation unit 21d determines configuration information (the position in the virtual space, a gaze position, a gazing direction, and the angle of view) of the virtual camera based on the tracking information of the tracking sensor 36a. Moreover, the video generation unit 21d determines a rendering area in the entire virtual space based on the configuration information of the virtual camera and generates moving image information for displaying the rendering area in the virtual space.

The video generation unit 21d may be configured to determine the position and the orientation of the first character object and the second character object in the virtual space, and the configuration information of the virtual camera based on tracking information of the tracking sensor 36b instead of or in addition to the tracking information of the tracking sensor 36a. The video generation unit 21d may be configured to determine the configuration information of the virtual camera based on tracking information of a sensor (which may be referred to as "active sensor" in this specification) selected from among the tracking sensor 36a and the tracking sensor 36b.

The video generation unit 21d is able to include voices of the actor A1 and the actor A2 collected by the microphone in the studio unit 30 with the generated moving image.

As described above, the video generation unit 21d generates an animation of the first character object moving in synchronization with the movement of the body and facial expression of the actor A1, and an animation of the second character moving in synchronization with the movement of the body and facial expression of the actor A2. The video generation unit 21d then includes the voices of the actor A1 and the actor A2 with the animations respectively to generate a video for distribution.

The video distribution unit 21e distributes the video generated by the video generation unit 21d. The video is distributed to the client devices 10a to 10c and other client devices over the network 50. The received video is reproduced in the client devices 10a to 10c.

The video may be distributed to a client device (not shown) installed in the studio room R, and projected from the client device onto the screen S via a short focus projector. The video may also be distributed to the supporter computer 40. In this way, the supporter B1 and the supporter B2 can check the viewing screen of the distributed video.

Figure 7:
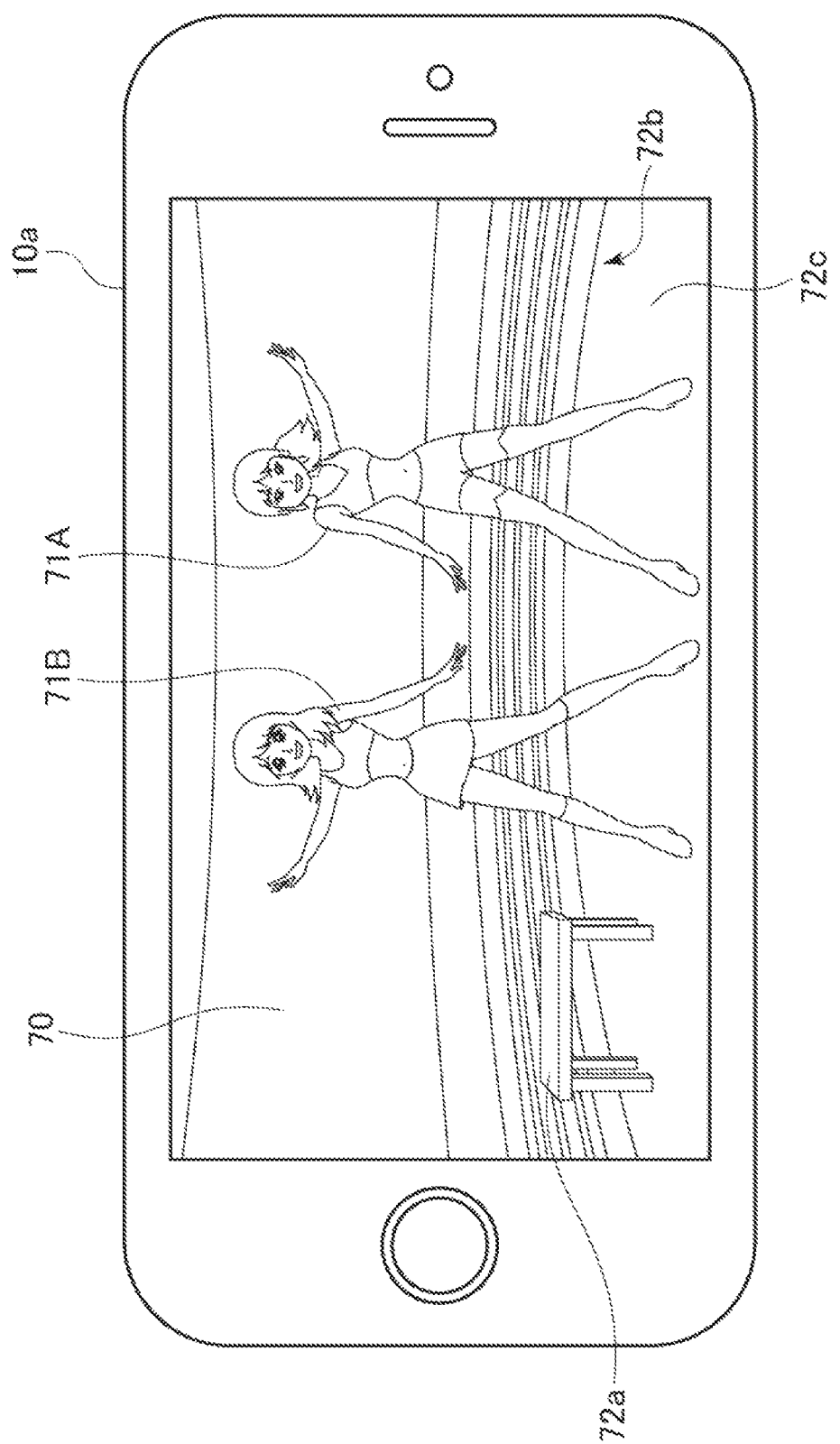
FIG. 7 illustrates an example of a video displayed on a client device 10a in one embodiment. An animation of a character object is included in FIG. 7.

An example of the screen on which the video distributed from the server device 20 to the client device 10a and reproduced by the client device 10a is displayed is illustrated in FIG. 7. As shown in FIG. 7, a display image 70 of the video distributed from the server device 20 is displayed on the display of the client device 10a. The display image 70 displayed on the client device 10a includes a character object 71A corresponding to the actor A1, a character object 71B corresponding to the actor A2, a floor object 72c corresponding to the studio floor on which the character object 71A and the character object 71B stand, a table object 72a representing a table disposed on the floor object 72c, and a studio set object 72b representing a studio set disposed on the floor object 72c, in a virtual space simulating the studio.

The table object 72a, the studio set object 72b, and the floor object 72c are not gift objects, but are objects used for constructing a virtual space included in the object data 23b. In the illustrated embodiment, the virtual space included in the video for distribution is a space that simulates a stage on which the character object 71A and the character object 71B perform. The floor object 72c corresponds to the floor of the stage. The floor object 72c extends horizontally in the virtual space. The studio set object 72b corresponds to the stage set on the stage. In the illustrated embodiment, the studio set object 72b extends in a circular arc shape in plan view to define the outer edge of the floor.

The character object 71A is generated by applying the first body motion data and the first face motion data of the actor A1 to the model data for the actor A1 included in the model data 23a. The character object 71A is motion controlled based on the first body motion data and the first face motion data. The character object 71B is generated by applying the second body motion data and the second face motion data of the actor A2 to the model data for the actor A2 included in the model data 23a. The character object 71B is motion controlled based on the second body motion data and the second face motion data. Thus, the character object 71A is controlled to move in the screen in synchronization with the motions of the body and facial expression of the actor A1, and the character object 71B is controlled to move in the screen in synchronization with the motions of the body and facial expression of the actor A2.

As described above, the video from the server device 20 may be distributed to the supporter computer 40. The video distributed to the supporter computer 40 is displayed on the supporter computer 40 in the same manner as FIG. 7. The supporter B1 and the supporter B2 are able to change the configurations of the components of the studio unit 30 while viewing the video reproduced by the supporter computer 40. In one embodiment, when the supporter B1 and the supporter B2 wish to change the angle of the character object 71A and the character object 71B in the video being streamed, they can cause an instruction signal to change the orientation of the tracking sensor 36a to be sent from the supporter computer 40 to the tracking sensor 36a. The tracking sensor 36a is able to change its orientation in accordance with the instruction signal. For example, the tracking sensor 36a may be rotatably attached to a stand via a pivoting mechanism that includes an actuator disposed around the axis of the stand. When the tracking sensor 36a received an instruction signal instructing to change its orientation, the actuator of the pivoting mechanism may be driven based on the signal, and the tracking sensor 36a may be turned by an angle according to the instruction signal. In one embodiment, the supporter B1 and the supporter B2 may cause the supporter computer 40 to transmit an instruction for using the tracking information of the tracking sensor 36b to the tracking sensor 36a and the tracking sensor 36b, instead of the tracking information from the tracking sensor 36a.

In one embodiment, when the supporter B1 and the supporter B2 determine that some instructions are needed for the actor A1 or the actor A2 as they viewing the video reproduced on the supporter computer 40, they may input a message indicating the instruction(s) into the support computer 40 and the message may be output to the display 39. For example, the supporter B1 and the supporter B2 can instruct the actor A1 or the actor A2 to change his/her standing position through the message displayed on the display 39.

The display request processing unit 21f receives a display request to display a gift object from a client device of a viewing user, and performs processing according to the display request. Each viewing user is able to transmit a display request to display a gift object to the server device 20 by operating his/her client device. For example, the first viewing user can transmit a display request to display a gift object to the server device 20 by operating the client device 10a. The display request to display a gift object may include the user ID of the viewing user and the identification information (object ID) that identifies the object for which the display request is made.

As described above, the gift object may include the effect object, the normal object, and the decorative object. The effect object and the normal object are examples of the first object. In addition, a display request requesting display of the effect object or the normal object is an example of a first display request.

Figure 8:
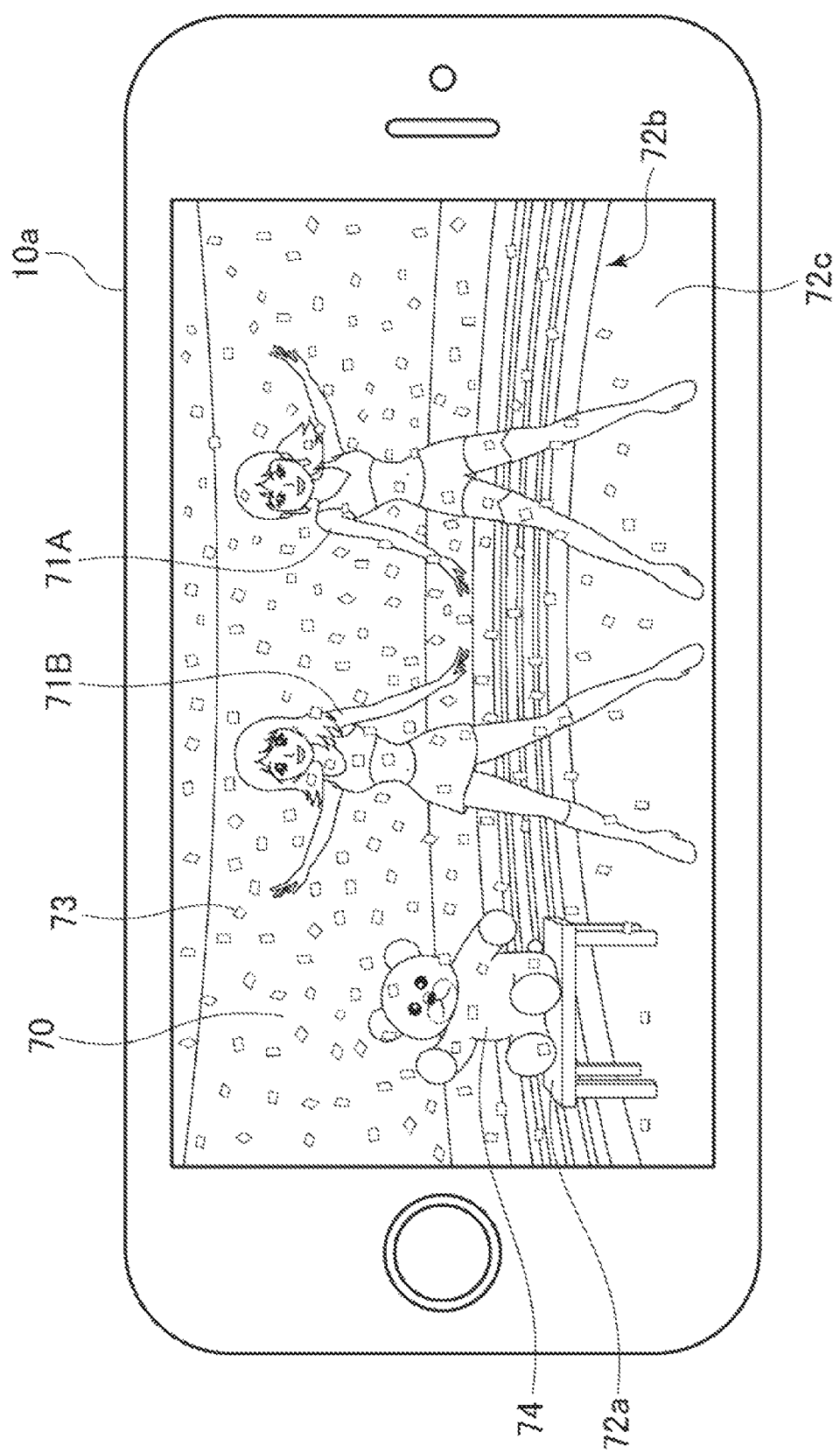
FIG. 8 illustrates an example of a video displayed on the client device 10a in one embodiment. A normal object is included in FIG. 8.

In one embodiment, when the display request processing unit 21f received a display request to display a specific effect object from a viewing user, the display request processing unit 21f performs a process, in response to the display request, to display the effect object for which the display request is made in the display image 70 of the video. For example, when a display request to display an effect object simulating confetti is made, the display request processing unit 21f displays an effect object 73 simulating confetti based on the display request as shown in FIG. 8.

In one embodiment, when the display request processing unit 21f received a display request to display a specific normal object from a viewing user, the display request processing unit 21f performs a process, in response to the display request, to display the normal object for which the display request is made in the video 70. For example, when a display request to display a normal object simulating a stuffed bear is made, the display request processing unit 21f displays a normal object 74 simulating a stuffed bear in the display image 70 based on the display request as shown in FIG. 8.

The display request for the normal object 74 may include a display position specifying parameter for specifying the display position of the normal object 74 in the virtual space. In this case, the display request processing unit 21f displays the normal object 74 at the position specified by the display position specifying parameter in the virtual space. For example, the display position specifying parameter may specify the upper position of the table object 72a representing a table as the display position of the normal object 74. A viewing user is able to specify the position where the normal object is to be displayed by using the display position specifying parameter while watching the layouts of the character object 71A, the character object 71B, the gift object, and other objects included in the video 70.

In one embodiment, the normal object 74 may be displayed such that it moves within the display image 70 of the video. For example, the normal object 74 may be displayed such that it falls from the top to the bottom of the screen. In this case, the normal object 74 may be displayed in the display image 70 during the fall, which is from when the object starts to fall and to when the object has fallen to the floor of the virtual space of the video 70, and may disappear from the display image 70 after it has fallen to the floor. A viewing user can view the falling normal object 74 from the start of the fall to the end of the fall. The moving direction of the normal object 74 in the screen can be specified as desired. For example, the normal object 74 may be displayed in the display image 70 so as to move from the left to the right, the right to the left, the upper left to the lower left, or any other direction of the video 70. The normal object 74 may move on various paths. For example, the normal object 74 can move on a linear path, a circular path, an elliptical path, a spiral path, or any other paths. The viewing user may include, in the display request to display the normal object, a moving direction parameter that specifies the moving direction of the normal object 74 and/or a path parameter that specifies the path on which the normal object 74 moves, in addition to or in place of the display position specifying parameter. In one embodiment, among the effect objects and the normal objects, those whose size in the virtual space is smaller than a reference size (for example, a piece of paper of confetti of the effect object 73) may be displayed such that a part or all of the object(s) is overlapped with the character object 71A and/or the character object 71B. In one embodiment, among the effect objects and the normal objects, those whose size in the virtual space is larger than the reference size (for example, the normal object 74 (the stuffed bear)) may be displayed at a position where the object is not overlapped with the character object. In one embodiment, among the effect objects and the normal objects, if those whose size in the virtual space is larger than the reference size (for example, the normal object 74 (the stuffed bear)) is overlapped with the character object 71A and/or the character object 71B, the object is displayed behind the overlapping character object.

In one embodiment, when the display request processing unit 21f received a display request to display a specific decorative object from a viewing user, the display request processing unit 21f adds the decorative object for which the display request is made to the candidate list 23d based on the display request. The display request to display the decorative object is an example of a second display request. For example, the display request processing unit 21f may store identification information (object ID) identifying the specific decorative object for which the display request has been made from the viewing user in the candidate list 23d in association with the user ID of the viewing user (see FIG. 4). When more than one display request to display a decorative object is made, for each of the display requests, the user ID of the viewing user who made the display request and the decorative object ID of the decorative object for which the display request is made by the viewing user are associated with each other and stored in the candidate list 23d.

In one embodiment, in response to one or more of the decorative objects included in the candidate list 23d being selected, the decorative object selection unit 21g performs a process to display the selected decorative object in the display image 70 of the video. In the specification, a decorative object selected from the candidate list 23d may be referred to as a "selected decorative object".

Figure 10:
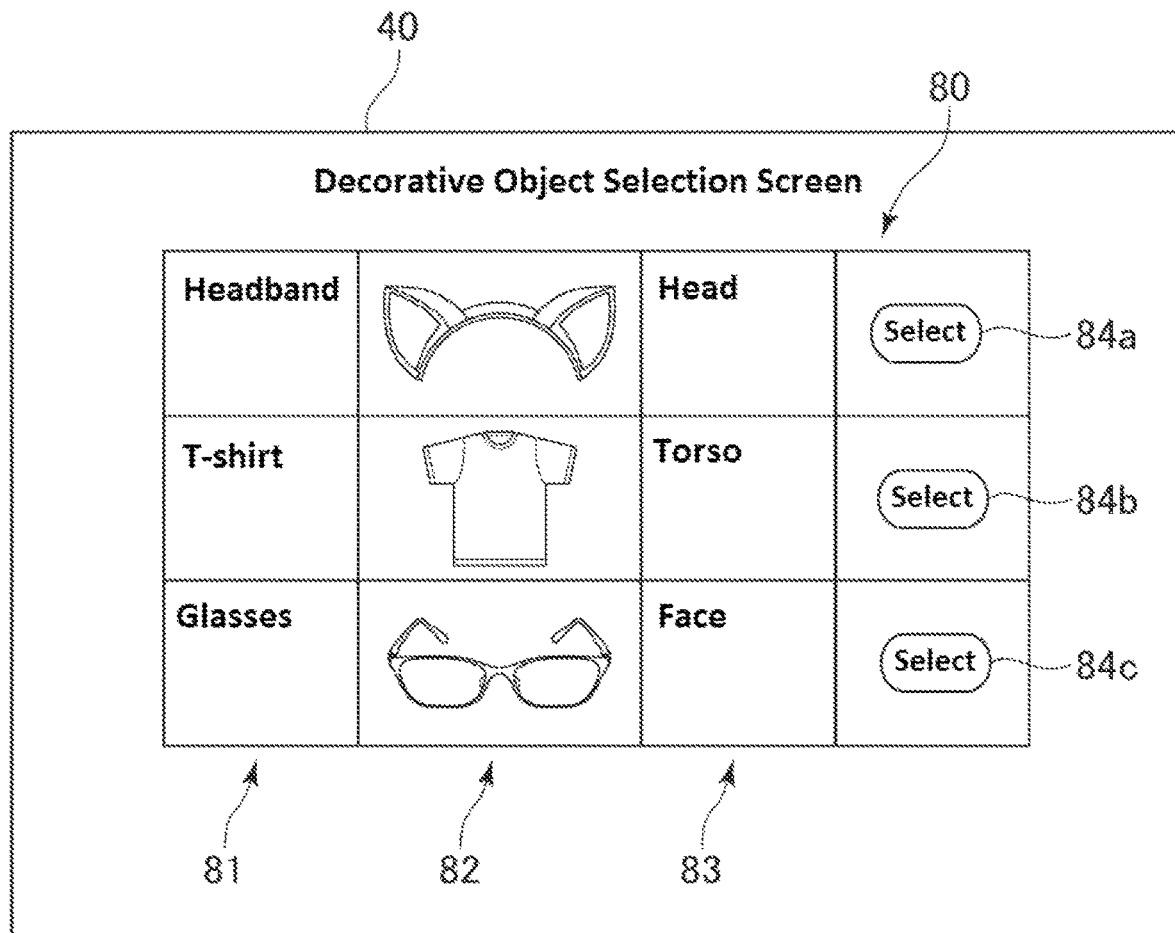
FIG. 10 schematically illustrates an example of a decorative object selection screen for selecting a desired decorative object from among the decorative objects included in the candidate list.

The selection of the decorative object from the candidate list 23d is made, for example, by the supporter B1 and/or the supporter B2 who operate the supporter computer 40. In one embodiment, the supporter computer 40 displays a decorative object selection screen. FIG. 10 shows an example of a decorative object selection screen 80 in one embodiment. The decorative object selection screen 80 is displayed, for example, on the display of the supporter computer 40. The decorative object selection screen 80 shows, for example, each of the plurality of decorative objects included in the candidate list 23d in a tabular form. As illustrated, the decorative object selection screen 80 in one embodiment includes a first column 81 showing the type of the decorative object, a second column 82 showing the image of the decorative object, and a third column 83 showing the body part of a character object associated with the decorative object. Further, on the decorative object selection screen 80, selection buttons 84a to 84c for selecting each decorative object are displayed. Thus, the decorative object selection screen 80 displays decorative objects that can be selected as the selected decorative object.

Figure 9:
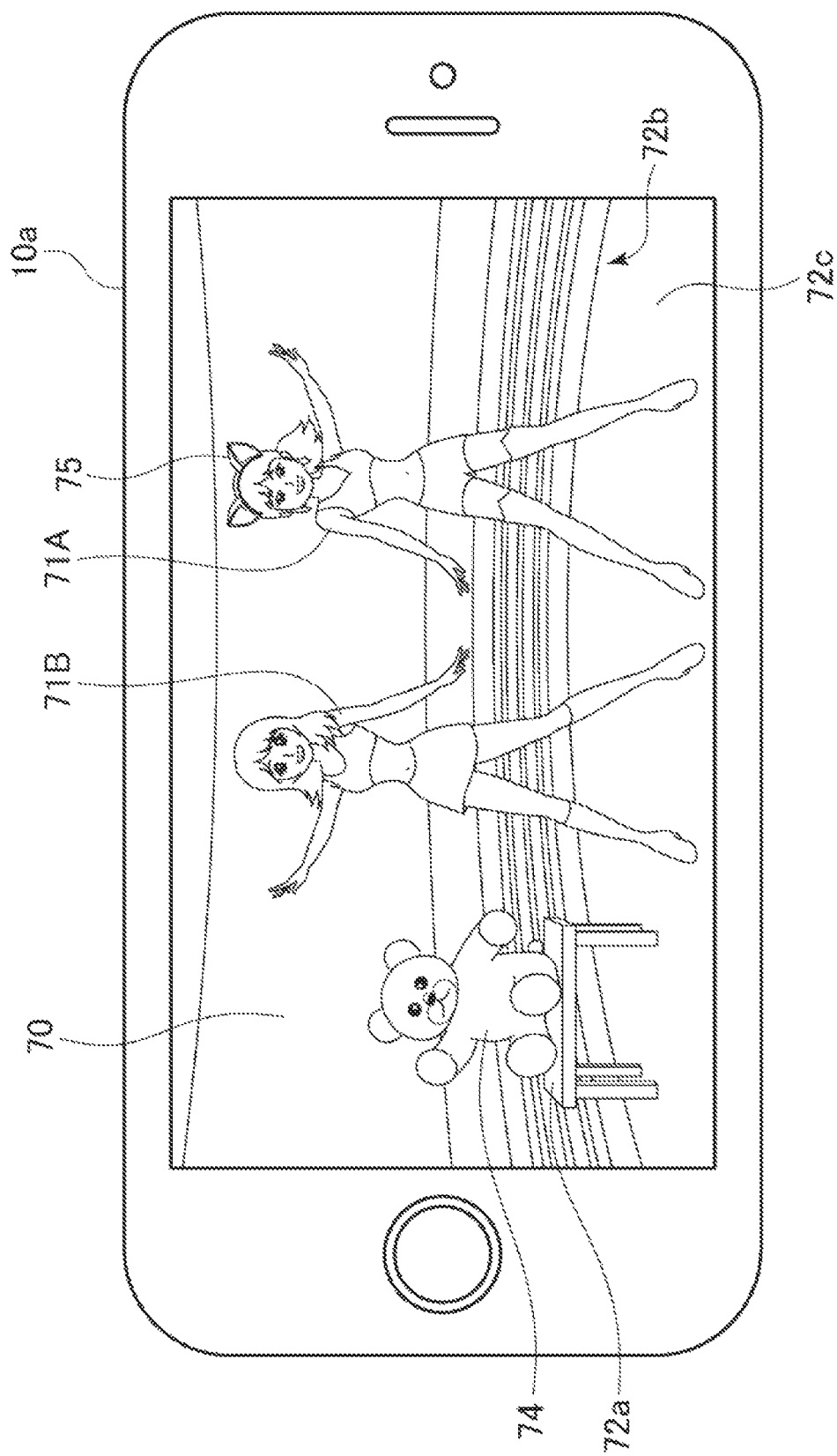
FIG. 9 illustrates an example of a video displayed on the client device 10a in one embodiment. A decorative object is included in FIG. 9.

The supporters B1 and B2 are able to select one or more of the decorative objects shown on the decorative object selection screen 80. For example, the supporter B1 and the supporter B2 are able to select a headband by selecting the selection button 84a. When it is detected by the decorative object selection unit 21g that the headband is selected, the display request processing unit 21f displays the selected decorative object 75 that simulates the selected headband on the display screen 70 of the video, as shown in FIG. 9. The selected decorative object 75 is displayed on the display image 70 in association with a specific body part of a character object. The selected decorative object 75 may be displayed such that it contacts with the specific body part of the character object. For example, since the selected decorative object 75 simulating the headband is associated with the head of the character object, it is attached to the head of the character object 71A as shown in FIG. 9. The decorative object may be displayed on the display screen 70 such that it moves along with the motion of the specific part of the character object. For example, when the head of the character object 71A with the headband moves, the selected decorative object 75 simulating the headband moves in accordance with the motion of the head of the character object 71A as if the headband is attached to the head of the character object 71A.

The selected decorative object 75 may be displayed on the display screen 70 in association with the character object 71B instead of the character object 71A. Alternatively, the selected decorative object 75 may be displayed on the display screen 70 in association with the character object 71A and the character object 71B.

The decorative object selection screen 80 may be configured to exclude information with which it is possible to identify a user who holds the decorative object or a user who has made a display request to display the decorative object. By configuring the decorative object selection screen 80 in this manner, it is possible to prevent a selector from giving preference to a particular user when selecting a decorative object.

In one embodiment, the decorative object selection screen 80 may display, for each decorative object, information regarding a user who holds the decorative object or a user who made a display request for the decorative object. Such information displayed for each decorative object may include, for example, the number of times that the user who made this display request of the decorative object has made display requests of the decorative object so far and the number of times that the decorative object has been actually selected (for example, information indicating that the display request to display the decorative object has been made five times and the decorative object has been selected two times among the five times), the number of times that the user views the video of the character object 71A and/or the character object 71B, the number of times that the user views a video (regardless of whether the character object 71A and/or the character object 71B appears in the video or not), the amount of money which the user spent for the gift object, the number of times that the user purchases the object, the points possessed by the user that can be used in the video distribution system 1, the level of the user in the video distribution system 1, and any other information about the user who made the display request to display the respective decorative object may be displayed.

According to this embodiment, it is possible to select the decorative object based on the behavior and/or the viewing history of the user who has made the display request of the decorative object in the video distribution system 1.

In one embodiment, a constraint(s) may be imposed on the display of decorative objects to eliminate overlapping. For example, with regard to the character object 71A, if a decorative object associated with the specific body part of the character object is already selected, selection of other decorative objects associated with the specific body part may be prohibited. As shown in the embodiment of FIG. 7, when the headband associated with the "head" of the character object 71B is already selected, the other decorative objects associated with the "head" (for example, a decorative object simulating a "hat" associated with the head) are not displayed on the decorative object selection screen 80, or a selection button for selecting the decorative object simulating the hat is made unselectable on decorative object selection screen 80. According to this embodiment, it is possible to prevent the decorative object from being displayed so as to overlap with a specific part of the character object.

The decorative object selection screen 80 may be displayed on another device instead of or in addition to the supporter computer 40. For example, the decorative object selection screen 80 may be displayed on the display 39 and/or the screen S in the studio room R. In this case, the actor A1 and the actor A2 are able to select a desired decorative object based on the decorative object selection screen 80 displayed on the display 39 or the screen S. Selection of the decorative object by the actor A1 and the actor A2 maybe made, for example, by operating the controller 33a, the controller 33b, the controller 34a, or the controller 34b.

In one embodiment, in response to a request from a viewing user of the video, the object purchase processing unit 21h transmits, to a client device of the viewing user (for example, the client device 10a), purchase information of each of the plurality of gift objects that can be purchased in relation to the video. The purchase information of each gift object may include the type of the gift object (the effect object, the normal object, or the decorative object), the image of the gift object, the price of the gift object, and any other information necessary to purchase the gift object. The viewing user is able to select a gift object to purchase it considering the gift object purchase information displayed on the client device 10a. The selection of the gift objects which the viewing user purchases may be performed by operating the client device 10a. When a gift object to be purchased is selected by the viewing user, a purchase request for the gift object is transmitted to the server device 20. The object purchase processing unit 21h performs a payment process based on the purchase request. When the payment process is completed, the purchased gift object is held by the viewing user. In this case, the object ID of the purchased gift object is stored in the possession list 23c in association with the user ID of the viewing user who purchased the object.

Gift objects that can be purchased may be different for each video. The gift objects may be made purchasable in two or more different videos. That is, the purchasable gift objects may include a gift object unique to each video and a common gift object that can be purchased in the videos. For example, the effect object that simulates confetti may be the common gift object that can be purchased in the two or more different videos.

In one embodiment, when a user purchases an effect object while viewing a video, the purchased effect object may be displayed automatically in the video that the user is viewing in response to completion of the payment process for purchasing the effect object. In the same manner, when a user purchases a normal object while viewing a video, the purchased normal object may be automatically displayed in the video that the user is viewing in response to completion of the payment process for purchasing the normal object.

In another embodiment, in response to completion of the payment process performed by the object purchase processing unit 21h for the effect object to be purchased, a notification of the completion of the payment process may be sent to the client device 10a, and a confirmation screen may be displayed to confirm whether the viewing user wants to make a display request to display the purchased effect object on the client device 10a. When the viewing user selects to make the display request of the purchased effect object, the display request to display the purchased effect object may be sent from the client device of the viewing user to the display request processing unit 21f, and the display request processing unit 21f may perform the process to display the purchased effect object in the display image 70 of the video. Even when the normal object is to be purchased, a confirmation screen may be displayed on the client device 10a to confirm whether the viewing user wants to make a display request to display the purchased normal object, in the same manner as above.

As described above, the client devices 10a to 10c and any other client devices may transmit, to the server device 20, post messages relating to the distributed video and any other post messages. The post message processing unit 21i is configured to perform a process for displaying the post messages received from the client devices 10a to 10c and other client devices in the video.

Figure 13:
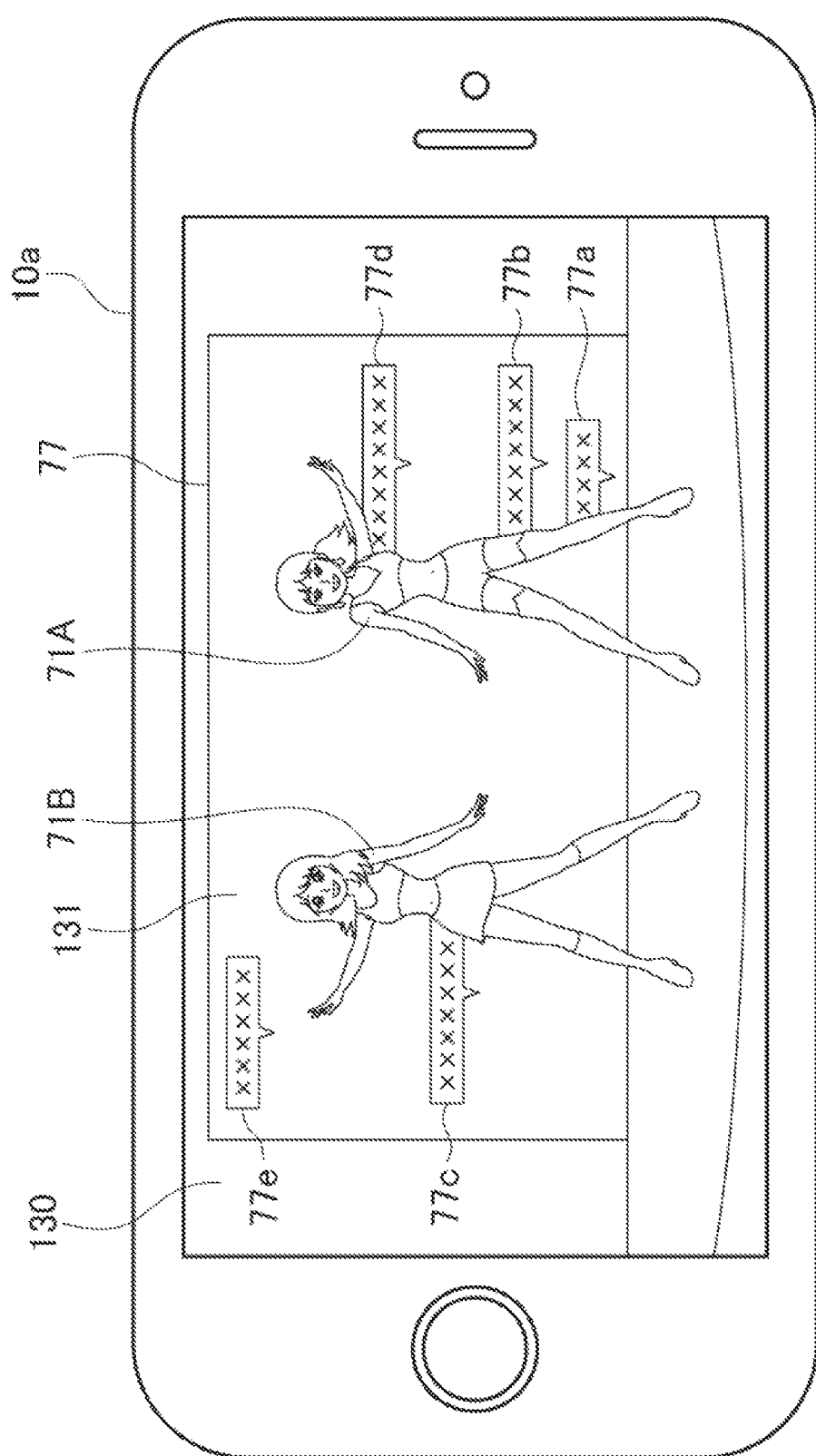
FIG. 13 illustrates an example of a video including a second post message displayed on the client device 10a in one embodiment.
Figure 14:
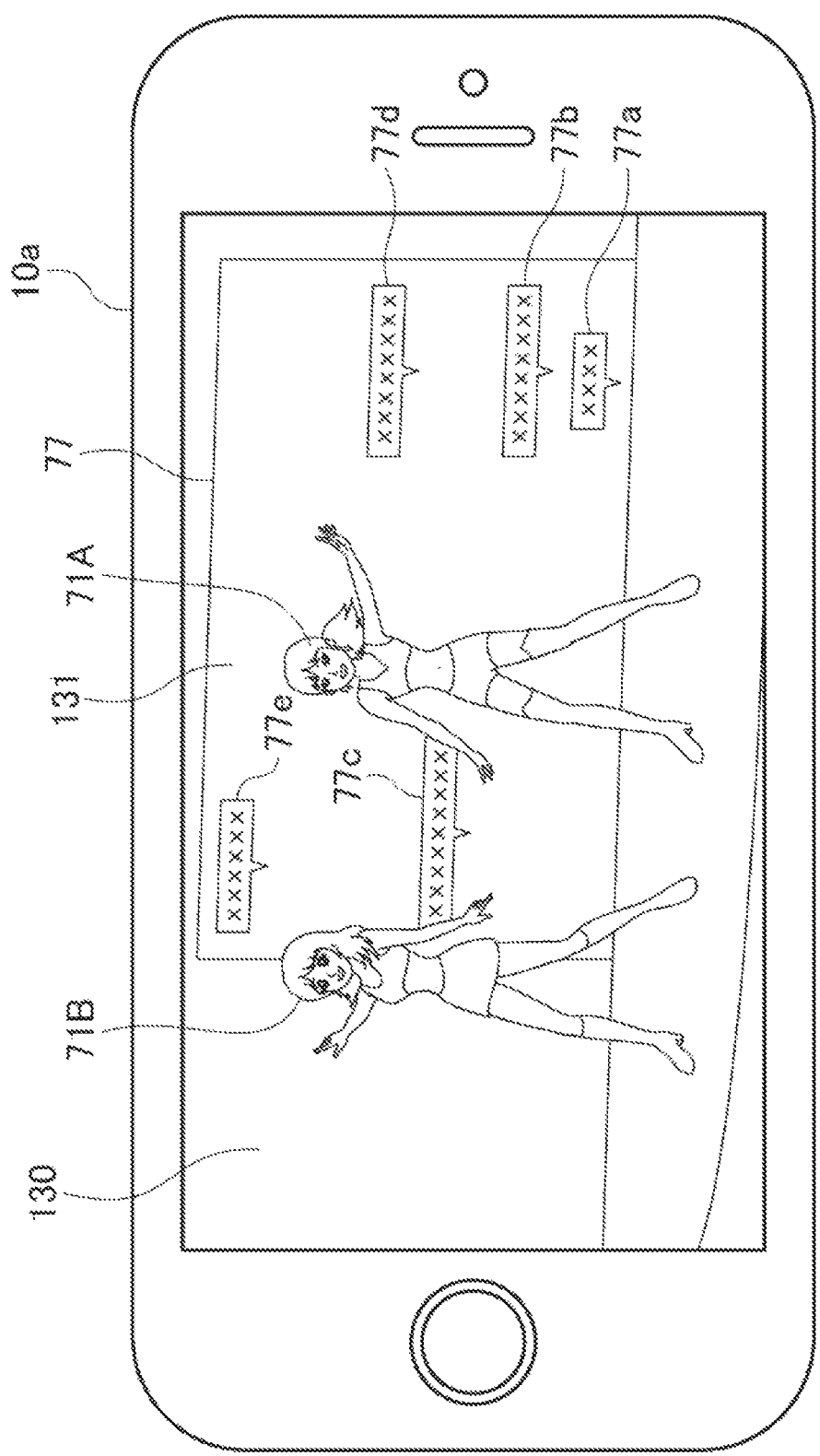
FIG. 14 illustrates an example of a video including a second post message displayed on the client device 10a in one embodiment.
Figure 15:
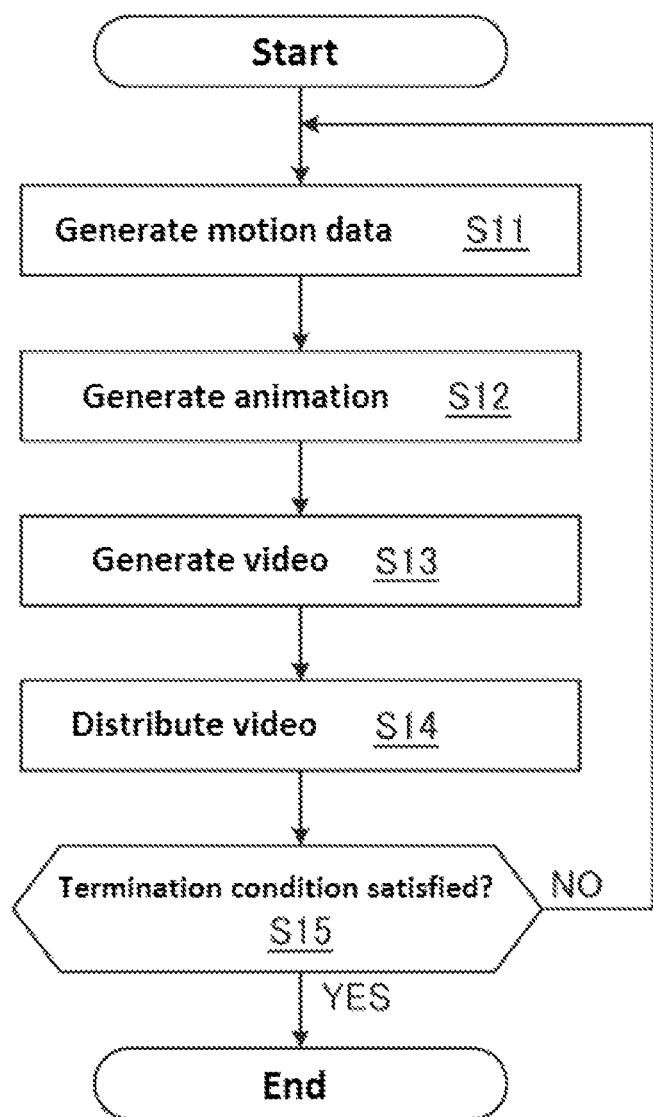
FIG. 15 is a flow chart showing a flow of a video distribution process in one embodiment.
Figure 16:
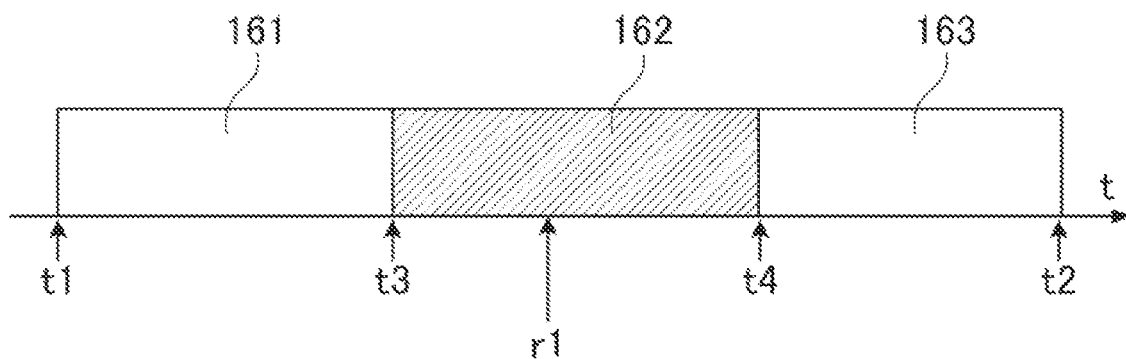
FIG. 16 is a diagram for describing division of a distribution period for a video distributed by the video distribution system of FIG. 1.

How the post message is displayed in one embodiment will be now described with reference to FIGS. 11 to 16. FIGS. 11 to 14 show display examples of post messages displayed in a video reproduced by the client device 10a. FIG. 15 is a flow chart showing the flow of the video distribution process in one embodiment, and FIG. 16 is a schematic diagram for explaining a first distribution period and a second distribution period in the video distribution. In the first distribution period, a first display area 76 is included in the video, and in the second distribution period, a second display area 77 is included in the video.

As shown in FIG. 16, in one embodiment, the server device 20 distributes a video between time t1 and time t2. The time t1 is the time when distribution of the video is started, and the time t2 is the time when distribution of the video is ended. In the illustrated embodiment, the first distribution period is between the time t1 and the time t3 and between the time t4 and the time t2 over the entire distribution period of the video, and the second distribution period is between the time t3 and the time t4. After the distribution start time t1 of the video, the first distribution period 161 continues to the time t3, and the first distribution period 161 is switched to the second distribution period 162 at the time t3, then the second distribution period 162 is switched to the first delivery period 163 at the time t4, and the first delivery period 163 continues until the 1st delivery period 163 continues until the delivery end time t2. The order between the first distribution period and the second distribution period, the length, the number of occurrences, and any other configurations relating to the first distribution period and the second distribution period may be determined as needed.

In one embodiment, the first distribution period and the second distribution period may be switched when a predetermined time arrives. For example, in the illustrated embodiment, the first distribution period 161 is switched to the second distribution period 162 at the time t3, and then the second distribution period 162 is switched to the first distribution period 163 at the time t4. In one embodiment, switching from the first distribution period to the second distribution period and switching from the second distribution period to the first distribution period may be performed in accordance with operation of the controller 33a or the controller 33b by the actor A1, or in accordance with operation of the controller 34a or the controller 34b by the actor A2. In one embodiment, switching from the first distribution period to the second distribution period and the switching from the second distribution period to the first distribution period may be performed in accordance with operation of the supporter computer 40 by the supporter B1 or the supporter B2. Alternatively, switching between the first distribution period and the second distribution period may be performed in a manner not explicitly described herein.

Figure 11:
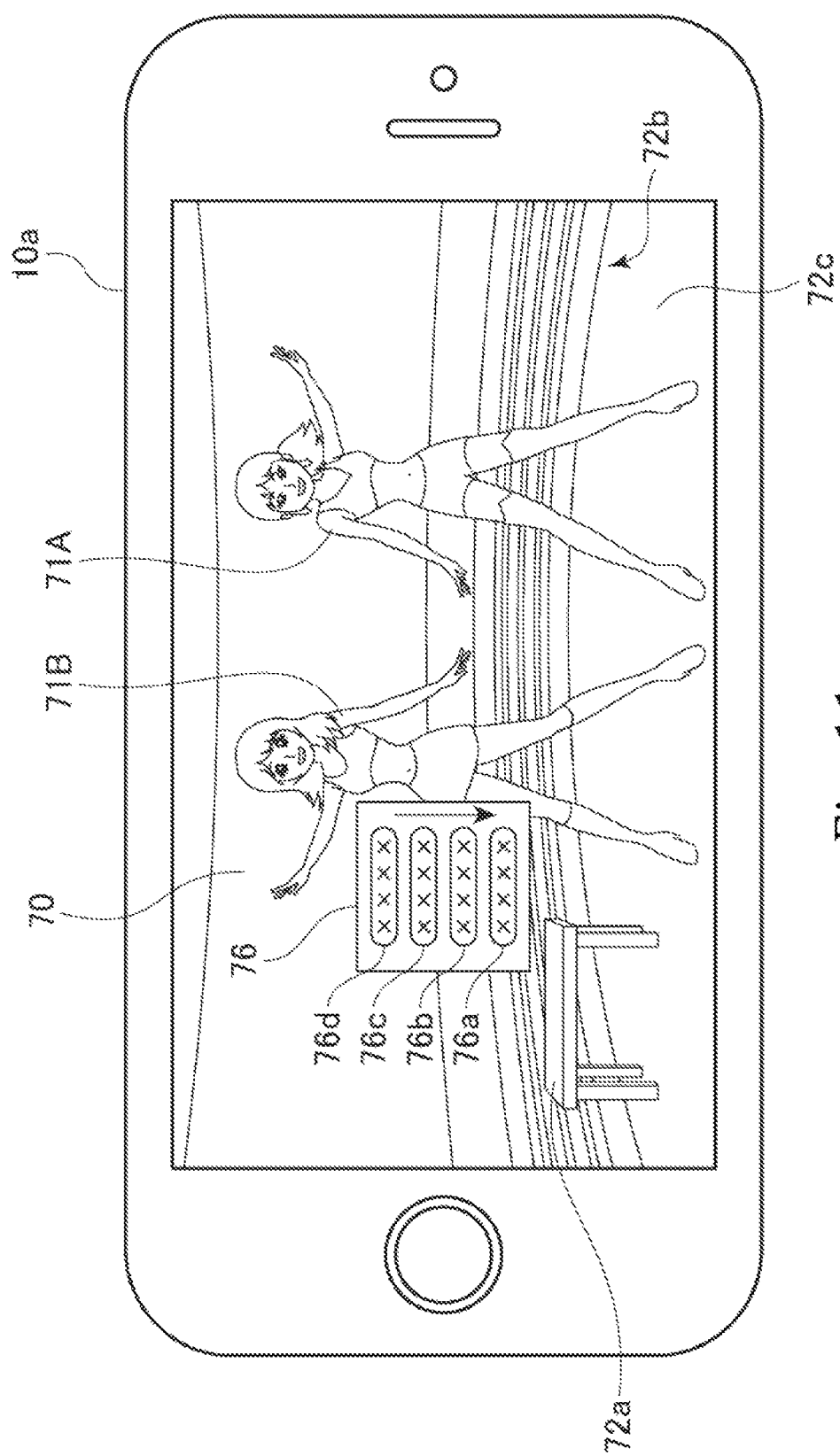
FIG. 11 illustrates an example of a video including a first post message displayed on the client device 10a in one embodiment.
Figure 12:
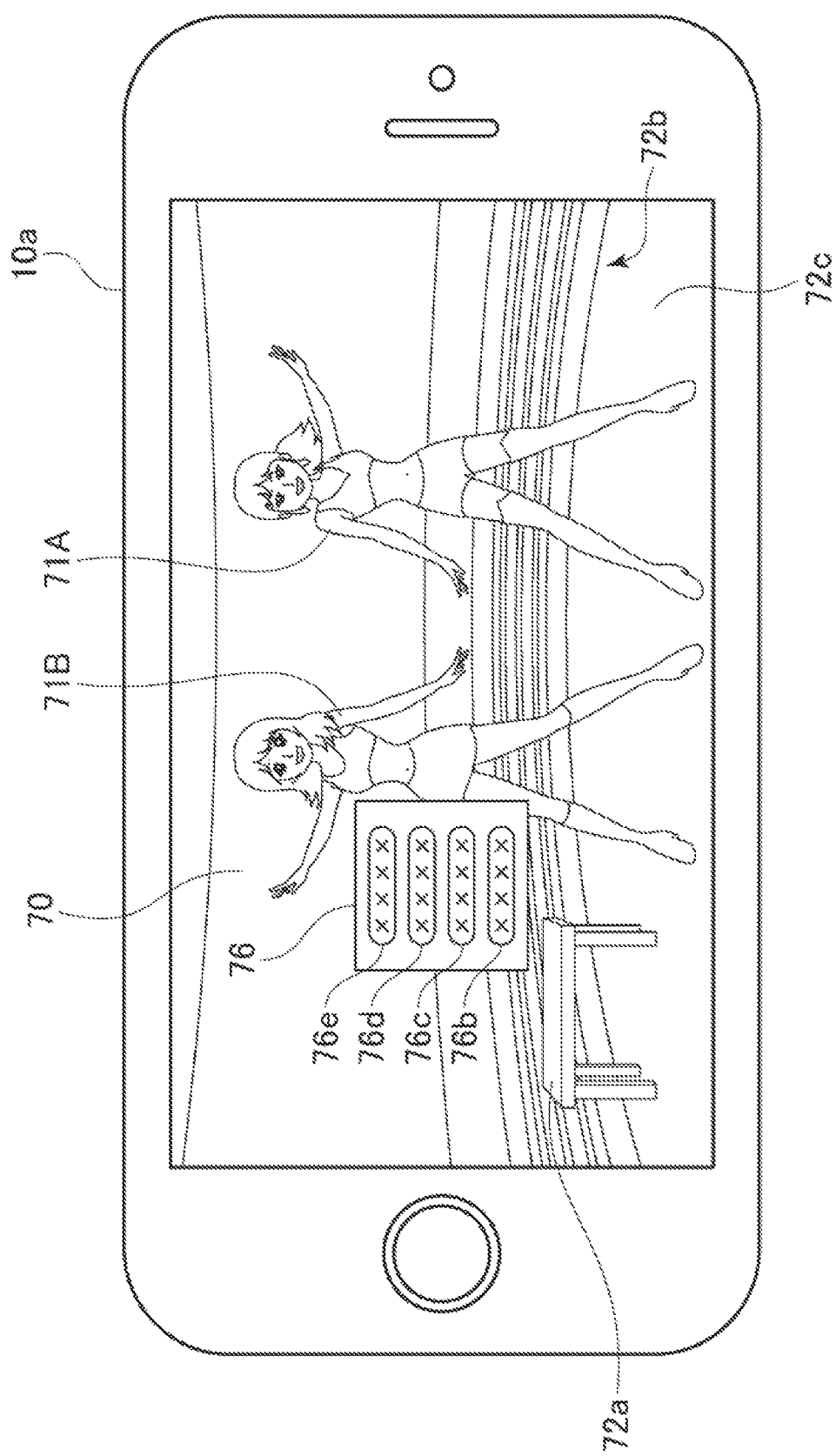
FIG. 12 illustrates an example of a video including a first post message displayed on the client device 10a in one embodiment.

FIGS. 11 and 12 show the display image 70 of the distributed video in the first distribution period. The display image 70 of the distributed video shown in FIG. 11 includes an image of the virtual space viewed from a viewpoint defined based on tracking information generated by the tracking sensor 36b disposed in front of the actor A1 and the actor A2. That is, the display image 70 is an image of the virtual space constructed using the position of the tracking sensor 36b in front of the actor A1 and the actor A2 as the virtual viewpoint. Thus the character object 71A and the character object 71B face the front in the display image 70.

In the illustrated embodiment, the reproduced video (or the display image 70 thereof) includes the first display area 76.

In one embodiment, the first display area 76 is a display area superimposed on the video generated by the video generation unit 21d. In one embodiment, the first display area 76 is a two-dimensional display area.

In one embodiment, the first display area 76 is not an object that constituting a part of the virtual space generated by the video generation unit 21d. In this case, the first display area 76 is displayed in a predetermined area irrespective of configuration information (position, orientation, and angle of view) of the virtual camera that is used to construct the virtual space generated by the video generation unit 21d. The first display area 76 may be displayed at a position where remains unchanged before and after the active sensor is switched. In the illustrated embodiment, a region occupying a certain area of the lower left of the display image 70 is specified as the first display area 76. The position of the first display area 76 is not limited to the position specifically described in the specification. As illustrated, the first display area 76 may be provided in an area overlapping with the character object 71A and/or the character object 71B. In the illustrated embodiment, the first display area 76 overlaps a part of the character object 71B. In the area where the first display area 76 and the character object 71B overlap, the first display area 76 and the post message included therein may be displayed anterior to the character object 71B in the screen. In this case, a part of the character object 71B is hidden by the first display area 76 or the post message displayed there and can not be viewed by the viewing user.

In one embodiment, post message processing unit 21i is configured to display post messages posted from the viewing users via the client devices 10a to 10c and other client devices in a display area of a user group to which the viewing user belongs respectively. Since post messages posted from the viewing users are stored as the posting data 23e in the storage 23, the post message processing unit 21i retrieves a post message from the storage 23, and may display the retrieved post message in the first display area 76 or the second display area 77 which will be described later. The post messages may be retrieved in the order of the time when the message is posted from older one to the last one.

In the embodiment shown in FIG. 11, four post messages 76a to 76d are displayed in the first display area 76. The post messages 76a to 76d may be post messages (first post messages) from the viewing users belonging to the first user group, or post messages from the viewing users belonging to the second user group (second post messages). For example, the post message 76a, the post message 76b, the post message 76c, and the post message 76d are retrieved from the storage 23 in this order, and the respective first post messages retrieved are displayed in the order they were retrieved. An example of a specific display process is as follows. After the first post message 76a is retrieved, the post message 76a is displayed at the top of the first display area 76. After the post message 76b is retrieved, the post message 76a moves downward from the original displayed position, and the post message 76b is displayed in the space made by this movement. In the same manner, each time a new post message is displayed, the post message already displayed is moved downward, and the new post message is displayed in the space made by the movement.

When a new post message is displayed after the post message 76a reaches the bottom of the first display area 76, the post message 76a reached the bottom is no longer displayed in the first display area 76. In the display image 70 of FIG. 11, it is assumed that the post message 76a has reached the bottom of the first display area 76. At this point, when a new post message 76e is retrieved from the storage 23 for display in the first display area 76, the post message 76a is no longer displayed in the first display area 76 as shown in FIG. 12, and the post message 76e is displayed in the space made by this movement after the remaining post messages (the first post messages 76b to 76d) move downward. Thus, the post message displayed in the first display area 76 continues to be displayed in the first display area 76 until it reaches the end of the first display area 76 in the moving direction.

In the first display area 76, not only the first post message posted from the viewing user but also various notifications from the server device 20 may be displayed. For example, when there is a display request to display a gift object from the first viewing user, this fact may be displayed in the first display area 76 as a message from the system. The notifications from the server device 20 that may be displayed in the first display area 76 may include various types of notifications. For instance, when a viewing user starts viewing a video, the notification from the server device 20 may be, for example, a message for notifying that the viewing user has started viewing the video.

As described above, the post message processing unit 21i performs the process of displaying in the first display area 76 post messages of users who belong to the first user group or the second user group. In the first display area 76, the first post message moves in a predetermined moving direction to create a space for displaying a new post message. In the embodiment shown in FIGS. 11 and 12, the first post message moves from the top to the bottom. The moving direction of the first post message in the first display area 76 is not limited to top to bottom. The moving direction of the first post message in the first display area 76 may be bottom to top, left to right, right to left, and any direction other than these.

Subsequently, a video that is distributed in the second distribution period will be described with reference to FIGS. 13 and 14. FIGS. 13 and 14 show an example of a display image 130 of the distributed video in the second distribution period. In the embodiment shown in FIGS. 13 and 14, it is assumed that a video in which the character object 71A and the character object 71B perform on the stage is distributed in the second distribution period. The display image 130 of the distributed video shown in FIG. 13 includes an image of the virtual space viewed from a viewpoint defined based on tracking information generated by the tracking sensor 36b disposed in front of the actor A1 and the actor A2. That is, the display image 130 is an image of the virtual space constructed using the position of the tracking sensor 36b in front of the actor A1 and the actor A2 as the virtual viewpoint. Thus the character object 71A and the character object 71B face the front in the display image 130. FIG. 14 shows the display image 130 of the video generated based on tracking information of the tracking sensor 36a. Since the tracking sensor 36a is disposed in the left front of the actor A1 and the actor A2, the character object 71A and the character object 71B face in a direction other than the front (right front) in the display image 130.

The second display area 77 is an area corresponding to part or all of the surface of one or more objects included in the virtual space generated by the video generation unit 21d. In the illustrated embodiment, the entire front surface of a screen-like screen object 131 is configured as the second display area 77. In the specification, like the screen object 131, an object provided with the second display area 77 may be referred to as a "display object" or a "message display object." Any object in the virtual space included in the distributed video may be set as the display object. In one embodiment, the gift object may be used as the display object.

In the embodiment of FIG. 13, the second display area 77 displays post messages (the second post messages) from viewing users who belongs to the second user group. In the illustrated example, five second post messages 77a to 77e are displayed in the second display area 77. In the specification, the second post messages 77a to 77e may be simply referred to as the "second post messages" when it is not necessary to distinguish the messages from each other. As shown in FIG. 13, the second post message 77a, the second post message 77b, the second post message 77c, the second post message 77d, and the second post message 77e are retrieved from the storage 23 in this order, and the retrieved second post messages are displayed in the second display area 77 in the order they were retrieved. The second display area 77 does not display post messages (the first post messages) from viewing users who belongs to the first user group. In the second distribution period, a viewing user belonging to the first user group is barred from posting a message by a function implemented in his/her client device or even if the viewing user is able to post a message, the message is not displayed in the display area 77.

The second post message displayed in the second display area 77 may be moved in a predetermined direction in the second display area 77. In the embodiment of FIG. 13, each second post message moves from the top to the bottom of the second display area 77. Since the screen object 131 (the second display area 77) is disposed behind the character object 71A and the character object 71B in the virtual space, among the second post messages displayed in the second display area 77, a part of the post messages 77a to 77d displayed in the second display area 77 respectively is hidden behind the character object 71A and the character object 71B. When the second post message has moved to the end of the second display area 77 in the direction of movement, it is no longer displayed on the display image 70. In one embodiment, a display object such as the screen object 131 is disposed behind the character object in the virtual space. In this way, the character object is not hidden behind the display object and the second post message displayed on the display object. As described above, it is assumed that the character object gives performance in the second distribution period. Therefore, by arranging the display object behind the character object, a viewing user is able to see the performance of the character object without being disturbed by other objects. This can prevent degradation of the user's viewing experience.

The moving direction of the second post message in the second display area 77 is not limited to top to bottom. The moving direction of the second post message in the second display area 77 may be bottom to top, left to right, right to left, and any direction other than these. The moving direction of the post message in the second display area 77 may be different from the moving direction of the first post message in the first display area 76.

In one embodiment, the moving direction of a post message in the second display area 77 may be determined in accordance with a first command included in the post message. For example, when creating a post message via the client device, the viewing user is allowed to include in the post message the first command specifying the moving direction. This first command may be, for example, the text "L, R" when designating the moving direction from left to right. The first command may be added, for example, following the body of the post message (the message displayed in the second display area 77). An at sign ("@"), a comma (","), a semicolon (";"), a colon (":") or the like may be interposed between the message body and the first command to separate them. Thus, the viewing user is able to create a post message so as to include the first command specifying the moving direction of the message in the second display area 77, and transmit the post message to the server device 20. The first command may be stored in the storage 23 as part of the post data 23e. When a post message is retrieved from the storage 23 and the post message was posted from the second user group, the post message processing unit 21i may display the post message in the second display area 77 such that the message is moved in the direction designated by the first command. The format of the first command mentioned above may be changed to any format.

In one embodiment, the position where a post message is initially displayed in the second display area 77 may be determined in accordance with a second command included in the post message. For example, when creating a post message via the client device, the viewing user is allowed to include, in the post message, the second command specifying the initial display position in the second display area 77. The second command may be, for example, the text "@L" when the initial display position is at the left end of the second display area, and "@R" when the initial display position is at the right end of the second display area, and the text "@C" when the initial display position is at the center of the second display area. The viewing user is able to create a post message so as to include the second command therein, and transmit the post message to the server device 20. The post message may include the first command in addition to the second command. The second command may be stored in the storage 23 as part of the post data 23e. When a post message is retrieved from the storage 23 and the post message was posted from the second user group, the post message processing unit 21i may display the post message at the initial display position specified by the second command in the second display area 77. When the post message also includes the first command, the post message processing unit 21i may display the post message at the initial display position specified by the second command, and then moves the post message in the direction specified by the first command. The format of the second command mentioned above may be changed to any format.

In one embodiment, the post message processing unit 21i may adjust the moving speed of each post message such that the moving speed of the second post message in the second display area 77 is slower than the moving speed of the first post message in the first display area 76.

In one embodiment, the post message processing unit 21i may adjust the moving speed of each post message such that a second display time period in which the second post message is displayed in the second display area 77 is made longer than a first display time period in which the first post message is displayed in the first display area 76. When the length of the first display area 76 in the moving direction of the first post message is same as the length of the second display area 77 in the moving direction of the second post message, the display time period of the second post message can be made longer than the display time of the first post message. as described above by making the moving speed of the second post message slower than the moving speed of the first post message. When the moving speed of the first post message and the moving speed of the second post message are the same, the display time period of the second post message can be made longer than the display time period of the first post message by making the length of the second display area 73 in the moving direction of the second post message longer than the length of the first display area 76 in the moving direction of the first post message.

In one embodiment, it is possible to change the display of a video that is to be distributed by camerawork. As described above, the display image 130 of the video to be distributed shown in FIG. 13 is generated based on the tracking information of the tracking sensor 36b disposed in front of the actor A1 and the actor A2. That is, the display image 130 is generated when the tracking sensor 36b is set as the active sensor. Therefore, in the display image 130 of FIG. 13, the character object 71A and the character object 71B face front. By switching the active sensor from the tracking sensor 36b to the tracking sensor 36a, a video including a virtual space generated based on tracking information of the tracking sensor 36a is generated. An example of the display image of the video generated based on the tracking information of the tracking sensor 36a is shown in FIG. 14. Since the tracking sensor 36a is disposed in the left front of the actor A1 and the actor A2, the character object 71A and the character object 71B face in a direction other than the front (right front) in the display image 130. Moreover, the screen object 131, the second display area 77 provided on the surface of the screen object 131, and the second post message displayed in the second display area 77 also look inclined.

Thus, the position and the orientation of the second display area 77 (or the screen object 131) in the virtual space depend on which tracking sensor is used as the active sensor. Moreover, when the position or the orientation of the active sensor is changed, the position or the orientation of the second display area 77 (or the screen object 131) in the virtual space is also changed accordingly. When the tracking sensor 36a shown in FIG. 14 serves as the active sensor, the second display area 77 (or the screen object 131) in the display image 130 looks smaller as viewed from the oblique direction compared to the second display area 77 (or the screen object 131) in the display image 130 when the tracking sensor 36a shown in FIG. 13 serves as the active sensor.

When the active sensor is switched from the tracking sensor 36b to the tracking sensor 36a, the position (the position of the viewpoint) of the virtual camera in the virtual space is also changed, so the position and the orientation of the second display area 77 in the virtual space are also changed. For example, in the display image of FIG. 13 where the tracking sensor 36b serves the active sensor, the position of each of the second post messages 77a to 77d is hidden behind the character object 71A or the character object 71B. Whereas in the display image 130 of FIG. 14 where the tracking sensor 36a serves as the active sensor, only the second post message 77c is hidden behind the character object, and the second post messages 77a, 77b, and 77d are wholly visible without being hidden behind the character objects since the viewpoint has moved. As described above, the second post message hidden behind the character object can be made visible by moving the viewpoint in the virtual space by switching the active sensor.

Next, with reference to FIG. 15, a video distribution process in one embodiment will be described. FIG. 15 is a flow chart showing the flow of the video distribution process in one embodiment. In the video distribution process, it is assumed that the actor A1 and the actor A2 are present in the studio room R.

First, in step S11, body motion data, which is a digital representation of the body motions of the actor A1 and the actor A2, and face motion data, which is a digital representation of the facial motions (expression) of the actor A1 and the actor A2, are generated. Generation of the body motion data is performed, for example, by the body motion data generation unit 21a described above, and generation of the face motion data is performed, for example, by the face motion data generation unit 21b described above.

Next, in step S12, by applying the body motion data and the face motion data of the actor A1 to the model data for the actor A1, animation of the first character object that moves in synchronization with motions of the body and face of the actor A1 is generated. Similarly, by applying the body motion data and the face motion data of the actor A2 to the model data for the actor A2, animation of the second character object that moves in synchronization with the motions of the body and facial expression of the actor A2 is generated. The generation of the animation is performed, for example, by the above-described animation generation unit 21c.

In step S13, a video including an image of the virtual space, the animation of the first character object corresponding to the actor A1, and the animation of the second character object corresponding to the actor A2 is generated. The voices of the actor A1 and the actor A2 may be included in the video. The animation of the first character object and the animation of the second character object may be provided in the virtual space. Generation of the video is performed, for example, by the above-described video generation unit 21d.

Next, the process proceeds to step S14 and the video generated in step S13 is distributed. The video is distributed to the client devices 10a to 10c and other client devices over the network 50. The video may be distributed to the supporter computer 40 and/or may be projected on the screen S in the studio room R. The video is distributed continuously over a predetermined distribution period. The distribution period of the video may be set to, for example, 30 seconds, 1 minute, 5 minutes, 10 minutes, 30 minutes, 60 minutes, 120 minutes, and any other length of time.

Subsequently in step S15, it is determined whether a termination condition for ending the distribution of the video is satisfied. The end condition is, for example, that the distribution ending time has come, that the supporter computer 40 has issued an instruction to end the distribution, or any other conditions. If the end condition is not satisfied, the steps S11 to S14 of the process are repeatedly executed, and distribution of the video including the animation synchronized with the motions of the actor A1 and the actor A2 is continued. When it is determined that the end condition is satisfied for the video, the distribution process of the video is ended.

Figure 17:
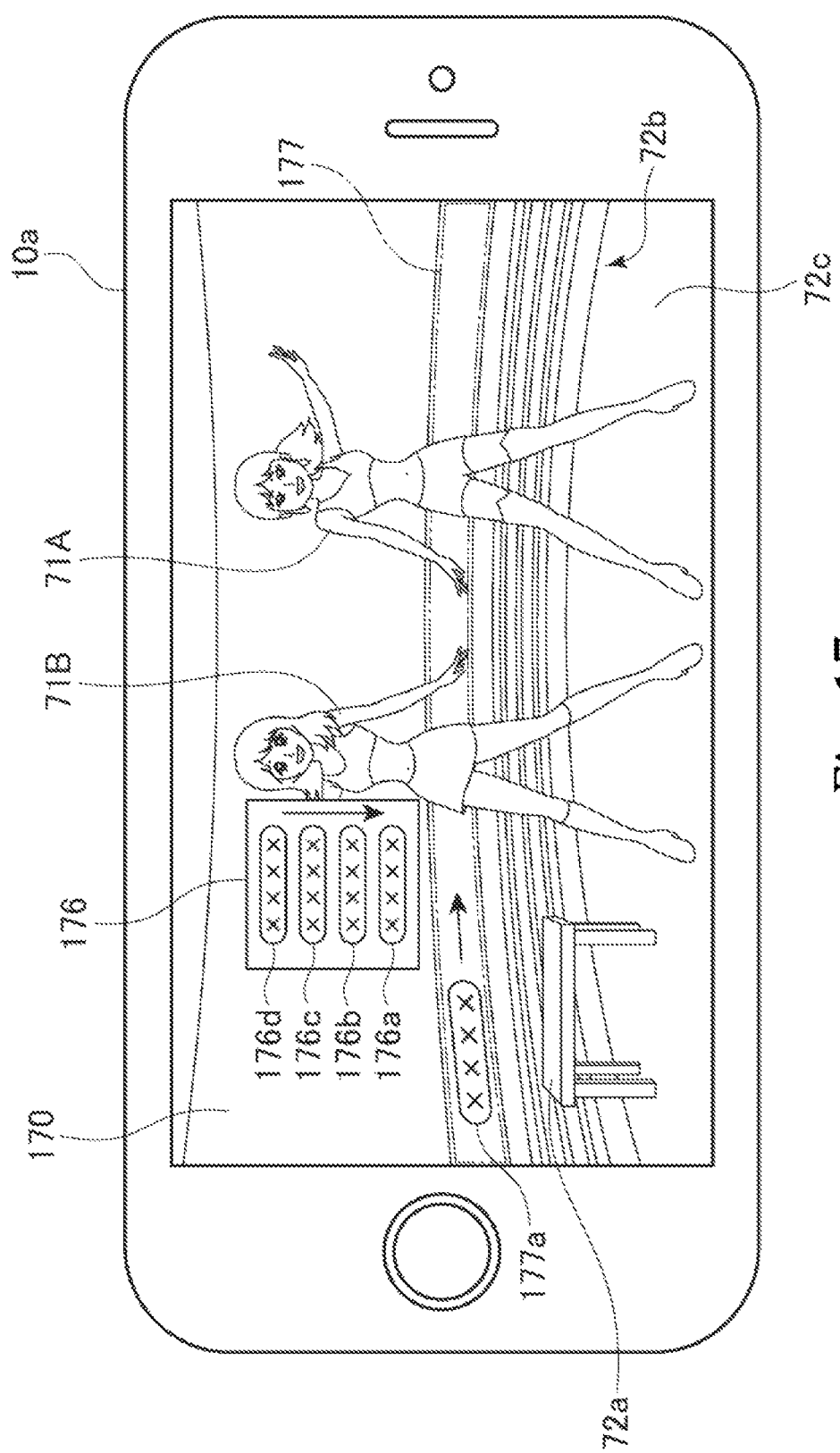
FIG. 17 illustrates an example of a video including a first post message displayed on the client device 10a in another embodiment.

Next, still another embodiment of the invention will be described with reference to FIGS. 17 and 18. FIG. 17 shows a display example of post messages displayed in a video reproduced by the client device 10a in one embodiment, and FIG. 18 is a flow chart showing the flow of a post message display process in the embodiment.

A display image 170 shown in FIG. 17 includes a first display area 176 and a second display area 177. In the first display area 176, first post messages 176a to 176d are displayed, and in the second display area 177, a second post message 177a is displayed. In the embodiment shown in FIG. 17, the post message processing unit 21i is configured to perform a process to display a post message (first post message) from a viewing user belonging to the first user group in the first display area 176, and display a post message (second post message) from a viewing user belonging to the second user group in the second display area 177.

Figure 18:
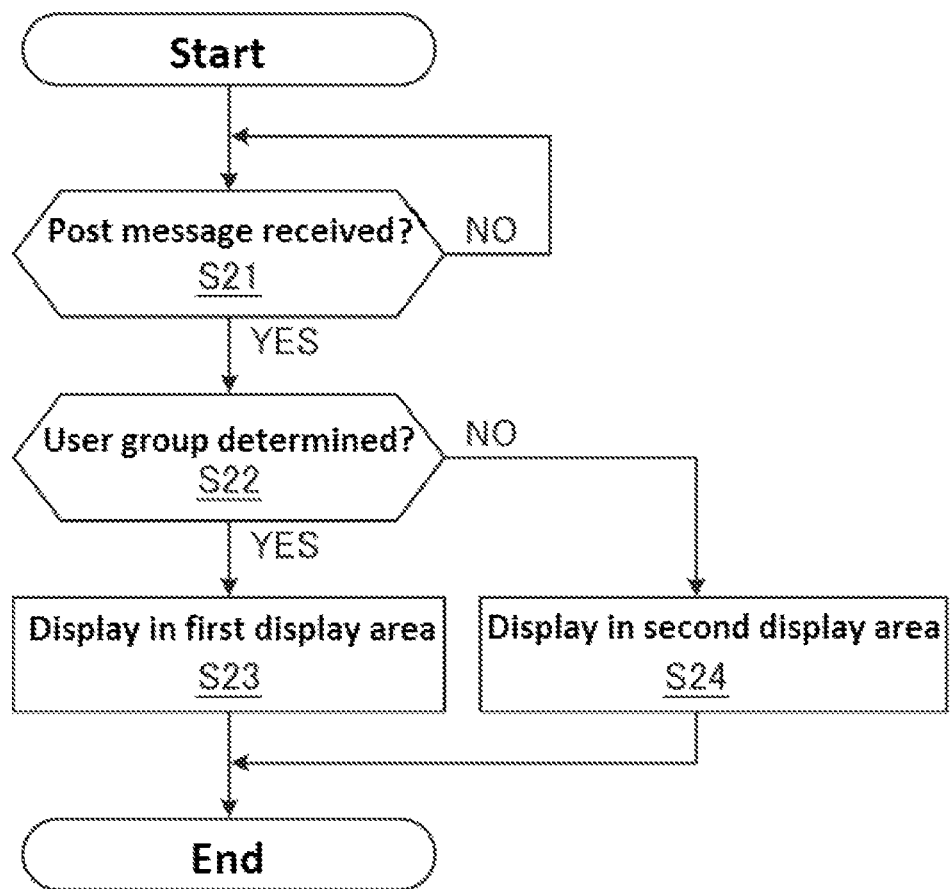
FIG. 18 is a flow chart showing the flow of a post message display process in the embodiment.

In the post message display process shown in FIG. 18, it is assumed that a message for a video is posted from a client device to the server device 20 that distributes the video during distribution of the video. The post message display process is performed in parallel with the video distribution process shown in FIG. 15. The post message received by the server device 20 is stored in the storage 23 as the post data 23e.

In step S21, the post message stored in storage 23 is retrieved. The post messages are retrieved, for example, in the order of posting.

Next, in step S22, it is determined to which user group the viewing user who has posted the post message retrieved from the storage 23 belongs. In the post data 23e, the post message is stored in association with the account information of the viewing user who has posted the post message and the group information indicating the user group to which the viewing user belongs, so by referring to the post data 23e, it is possible to determine the user group to which the user who posted the post message belongs.

When it is determined that the viewing user who has posted the post message belongs to the first user group, the display process proceeds to step S23, whereas when it is determined that the viewing user who has posted the post message belongs to the second user group, the display process proceeds to step S24.

In step S23, the post message retrieved in step S21 is displayed in the first display area (for example, the first display area 176).

In step S24, the post message retrieved in step S21 is displayed in the second display area (for example, the second display area 177).

As described above, the post message read from the storage 23 is displayed in the display area corresponding to the user group to which the user who has posted the post message belongs.

According to the embodiment, distributed is the video that includes the first display area 176 in which the first post message is displayed and the second display area 177 in which the first post message is not displayed but the second post message is displayed. Thereby, the display area for the post message can be allocated according to the user group to which the user who has posted the post message belongs. Since only a single display area was provided for posting messages in a predetermined area of the display screen of the conventional system, post messages from users of various user groups are displayed in the same display area. Whereas according to the above embodiment, the display process of the post message is performed according to the user group to which the user who has posted the post message belongs. Thereby, the ways to display the post message can be diversified.

In one embodiment, a part of the second display area 177 is disposed behind the character object 71A and the character object 71B. In this way, it possible to display the second post message in an area where it is easier to attract the attention of other users.

In one embodiment, the second display area 177 is included in the video during the second distribution period in which the actor A1 and the actor A2 perform. The second display area 177 is displayed behind the character object 71A and the character object 71B that are motion controlled in accordance with the performance of the actor A1 and the actor A2, so it easily attracts the attention of other users. Further, since the second display area 177 is disposed behind the character object 71A and the character object 71B, the second display area 177 is unlikely to interfere with viewing of the performance of the character object 71A and the character object 71B.

In one embodiment, when the first display area 176 overlaps with the character object 71A and/or the character object 71B, the character object is disposed behind the first display area 176. In this manner, during a distribution period in which display of messages posted by the viewing user, the actor A1 and the actor A2 is emphasized, the post messages are displayed without being hidden behind the character objects.

In the above-described embodiment, the way to display the post messages can be changed depending on the content of the video (for example, whether the actor is performing or not). Therefore, the ways to display post messages can be diversified without deteriorating the viewing experience of the video by the viewing user.

In the above embodiment, regarding the display of post messages, the viewing user belonging to the second user group is more privileged to receive provision of a better service or an excellent function compared to the viewing user belonging to the first user group.

For example, a viewing user belonging to the second user group is able to specify the moving direction of the second post message using the first command, and/or specify the display start position of the second post message using the second command. In this way, the viewing user belonging to the second user group can move his/her post message in a direction that is likely to attract more attention or can display his/her post message at a position that is more likely to attract attention. Whereas a viewing user who belongs to the first user group is unable to specify the moving direction of his/her post message or specify the initial display position.

In the above embodiment, the display control of post messages is performed such that the moving speed of the second post message in the second display area 177 is slower than the moving speed of the first post message in the first display area 176. Thus, the viewing user belonging to the second user group can display his/her post message longer on the display screen than the message of the viewing user belonging to the first user group.

In the above embodiment, a viewing user belonging to the second user group is able to post a message in any of the first distribution periods 161, 163 and the second distribution period 162. Whereas a viewing user belonging to the first user group is able to post a message only in the first distribution periods 161 and 163.

Embodiments of the invention are not limited to the above-described embodiments, and various modifications can be made without departing from the scope of the invention. For example, shooting and production of the video to be distributed may be performed outside the studio room R. For example, video shooting to generate a video to be distributed may be performed at an actor's or supporter's home.

Post messages posted from viewing users may not be stored in the storage 23. In this case, the post message processing unit 21*i* parses a post message received from the client device to specify the user group to which the user who has posted the post message belongs, and the post message may be displayed in the display area corresponding to the specified user group.

The procedures described herein, particularly those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention.

What is claimed is:

1. A video distribution system, comprising:
a storage storing a first post message and a second post message, the first post message being posted by a first viewing user classified into a first user group in accordance with an adjustable classification criterion, the second post message being posted by a second viewing user classified into a second user group in accordance with the classification criterion; and
one or more computer processors,
wherein the one or more computer processors execute computer-readable instructions to:
select a first display area for displaying the first post message based on the first viewing user belonging to the first user group;
select a second display area for displaying the second post message based on the second viewing user belonging to the second user group; and
distribute a video that includes:
the first display area in which the first post message posted by the first viewing user belonging to the first user group is displayed; and
the second display area in which the second post message posted by the second viewing user belonging to the second user group is displayed and the first post message posted by the first viewing user belonging to the first user group is not displayed,
wherein the first display area is distinct from the second display area, and
wherein the one or more computer processors adjust the classification criterion when a difference between a number of the second viewing users belonging to the second user group and a number of the first viewing users belonging to the first user group is smaller than a predetermined value.

2. The video distribution system of claim 1, wherein the one or more computer processors adjust the classification criterion such that a number of the first viewing users belonging to the first user group is smaller than a number of the second viewing users belonging to the second user group.

3. The video distribution system of claim 1, wherein the one or more computer processors classify viewing users who view the video into the first user group or the second user group based on viewing time for which the viewing users viewed the video and the classification criterion.

4. The video distribution system of claim 1, wherein the one or more computer processors classify viewing users who view the video into the first user group or the second user group based on a number of times for which the viewing users viewed the video and the classification criterion.

5. The video distribution system of claim 1, wherein the one or more computer processors classify viewing users who view the video into the first user group or the second user group based on a quantity or a purchase amount of electronic gifts purchased by the viewing users and the classification criterion.

6. The video distribution system of claim 1, wherein the one or more computer processors classify viewing users who view the video into the first user group or the second user group based on a number of post messages posted by the viewing users and the classification criterion.

7. The video distribution system of claim 1, wherein the adjustable classification criterion includes a first classification criterion and a second classification criterion different from the first classification criterion,
wherein the one or more computer processors changes the first classification criterion to the second classification criterion in response to a difference between a number of the second viewing users belonging to the second user group and a number of the first viewing users belonging to the first user group being smaller than a predetermined value.

8. The video distribution system of claim 7, wherein the second classification criterion causes fewer viewing users to be classified into the second user group than the first classification criterion.

9. The video distribution system of claim 1, the first display area not to display messages posted by the users of the second user group.

10. A video distribution method for distributing a video performed by one or more computer processors executing computer readable instructions, the video distribution method comprising:
storing a first post message posted by a first viewing user classified into a first user group in accordance with an adjustable classification criterion;

storing a second post message posted by a second viewing user classified into a second user group in accordance with the classification criterion;

selecting a first display area for displaying the first post message based on the first user belonging to the first user group;

selecting a second display area for displaying the second post message based on the second user belonging to the second user group; and distributing a video that includes:

the first display area in which the first post message posted by the first viewing user belonging to the first user group is displayed and the second post message posted by the second viewing user belonging to the second user group is not displayed; and the second display area in which the second post message posted by the second viewing user belonging to the second user group is displayed and the first post message posted by the first viewing user belonging to the first user group is not displayed, the first display area being distinct from the second display area, wherein the video distribution method comprises adjusting the classification criterion when a difference between a number of the second viewing users belonging to the second user group and a number of the first viewing users belonging to the first user group is smaller than a predetermined value.

11. The video distribution method of claim 10, the first display area not to display messages posted by the users of the second user group.

12. A non-transitory computer-readable storage medium storing a program for distributing a video executed by one or more computer processors, wherein the program causes the one or more computer processors to:

store a first post message posted by a first viewing user classified into a first user group in accordance with an adjustable classification criterion;

store a second post message posted by a second viewing user classified into a second user group in accordance with the classification criterion;

select a first display area for displaying the first post message based on the first viewing user belonging to the first user group;

select a second display area for displaying the second post message based on the second viewing user belonging to the second user group; and distribute the video that includes:

the first display area in which the first post message posted by the first viewing user belonging to the first user group is displayed and the second post message posted by the second viewing user belonging to the second user group is not displayed; and the second display area in which the second post message posted by the second viewing user belonging to the second user group is displayed and the first post message posted by the first viewing user belonging to the first user group is not displayed, the first display area being distinct from the second display area, wherein the program causes the one or more computer processors to adjust the classification criterion when a difference between a number of the second viewing users belonging to the second user group and a number of the first viewing users belonging to the first user group is smaller than a predetermined value.

13. The non-transitory computer-readable storage medium of claim 12, the first display area not to display messages posted by the users of the second user group.

* * * * *